(12) United States Patent
Dawson et al.

(10) Patent No.: US 7,898,993 B2
(45) Date of Patent: Mar. 1, 2011

(54) EFFICIENCY AND RESILIENCY ENHANCEMENTS FOR TRANSITION STATES IN AD HOC NETWORKS

(75) Inventors: Christopher J. Dawson, Arlington, VA (US); Peter G. Finn, Brampton (CA); Rick A. Hamilton, II, Charlottesville, VA (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 655 days.

(21) Appl. No.: 11/755,771

(22) Filed: May 31, 2007

(65) Prior Publication Data

US 2008/0298282 A1    Dec. 4, 2008

(51) Int. Cl.
*H04B 7/00* (2006.01)
(52) U.S. Cl. .......................... 370/310; 370/329
(58) Field of Classification Search ......... 370/310–350; 455/41.2
See application file for complete search history.

(56) References Cited

U.S. PATENT DOCUMENTS

| | | | |
|---|---|---|---|
| 5,490,201 A | 2/1996 | Moberg et al. | |
| 6,006,084 A | 12/1999 | Miller et al. | |
| 6,035,281 A | 3/2000 | Crosskey et al. | |
| 6,047,268 A | 4/2000 | Bartoli et al. | |
| 6,366,907 B1 | 4/2002 | Fanning et al. | |
| 6,396,805 B2 * | 5/2002 | Romrell | 370/216 |
| 6,397,061 B1 | 5/2002 | Jordan et al. | |
| 6,522,735 B1 | 2/2003 | Fortman et al. | |
| 6,653,933 B2 | 11/2003 | Raschke et al. | |
| 6,751,196 B1 | 6/2004 | Hulyalkar et al. | |
| 6,763,248 B1 | 7/2004 | Odamura | |
| 6,810,428 B1 | 10/2004 | Larsen et al. | |
| 6,850,764 B1 | 2/2005 | Patel | |
| 6,941,378 B2 | 9/2005 | Apostolopoulos et al. | |
| 6,954,616 B2 | 10/2005 | Liang et al. | |
| 6,954,790 B2 | 10/2005 | Forslöw | |
| 6,961,575 B2 | 11/2005 | Stanforth | |
| 6,975,613 B1 | 12/2005 | Johansson | |
| 6,980,511 B1 | 12/2005 | Li | |
| 6,990,113 B1 | 1/2006 | Wang et al. | |

(Continued)

FOREIGN PATENT DOCUMENTS

EP    0999662    5/2005

(Continued)

OTHER PUBLICATIONS

Non-final Office Action dated Dec. 23, 2008 in U.S. Appl. No. 11/755,806.

(Continued)

*Primary Examiner*—Kent Chang
*Assistant Examiner*—Kashif Siddiqui
(74) *Attorney, Agent, or Firm*—William Schiesser; Roberts Mlotkowski Safran & Cole

(57) ABSTRACT

A method includes establishing an ad hoc network between at least a borrower and at least one lender of bandwidth and downloading requested data from a data source via the ad hoc network. The method further includes leaving the ad hoc network while maintaining some of the downloaded requested data. The method further includes reestablishing a connection to the data source for completing the downloading of the requested data.

39 Claims, 15 Drawing Sheets

U.S. PATENT DOCUMENTS

| | | | |
|---|---|---|---|
| 7,016,375 | B1 | 3/2006 | Rosenberg et al. |
| 7,028,096 | B1* | 4/2006 | Lee .......................... 709/231 |
| 7,043,225 | B1 | 5/2006 | Patel et al. |
| 7,058,014 | B2 | 6/2006 | Sim |
| 7,058,387 | B2 | 6/2006 | Kumar et al. |
| 7,065,367 | B2 | 6/2006 | Michaelis et al. |
| 7,075,890 | B2 | 7/2006 | Ozer et al. |
| 7,089,301 | B1 | 8/2006 | Labio et al. |
| 7,130,283 | B2 | 10/2006 | Vogel et al. |
| 7,174,385 | B2 | 2/2007 | Li |
| 7,224,964 | B2 | 5/2007 | Souissi et al. |
| 7,240,015 | B1 | 7/2007 | Karmouch et al. |
| 7,257,632 | B2 | 8/2007 | Zhang et al. |
| 7,274,658 | B2 | 9/2007 | Bornstein et al. |
| 7,310,641 | B2 | 12/2007 | Moore et al. |
| 7,340,759 | B1 | 3/2008 | Rodriguez |
| 7,376,747 | B2 | 5/2008 | Hartop |
| 7,401,153 | B2 | 7/2008 | Traversat et al. |
| 7,440,573 | B2 | 10/2008 | Lor et al. |
| 7,447,656 | B2 | 11/2008 | Parthasarathy |
| 7,450,517 | B2* | 11/2008 | Cho .......................... 370/238 |
| 7,450,949 | B2 | 11/2008 | Choksi |
| 7,460,549 | B1 | 12/2008 | Cardei et al. |
| 7,463,890 | B2 | 12/2008 | Herz |
| 7,489,656 | B2 | 2/2009 | Guo et al. |
| 7,546,342 | B2 | 6/2009 | Li et al. |
| 7,593,333 | B2 | 9/2009 | Li et al. |
| 2001/0029182 | A1 | 10/2001 | McCann et al. |
| 2002/0053033 | A1 | 5/2002 | Cooper et al. |
| 2002/0053082 | A1 | 5/2002 | Weaver et al. |
| 2002/0058499 | A1 | 5/2002 | Ortiz |
| 2002/0069278 | A1 | 6/2002 | Forslöw |
| 2002/0102987 | A1 | 8/2002 | Souisse et al. |
| 2002/0110110 | A1 | 8/2002 | Tiihonen et al. |
| 2002/0120873 | A1 | 8/2002 | Salmivalli |
| 2002/0122410 | A1* | 9/2002 | Kulikov et al. .............. 370/349 |
| 2002/0141358 | A1 | 10/2002 | Requena |
| 2002/0145978 | A1 | 10/2002 | Batsell et al. |
| 2003/0068975 | A1 | 4/2003 | Qiao et al. |
| 2003/0117978 | A1* | 6/2003 | Haddad ...................... 370/331 |
| 2003/0120594 | A1 | 6/2003 | Shaginaw et al. |
| 2003/0137976 | A1 | 7/2003 | Zhu et al. |
| 2003/0139180 | A1 | 7/2003 | McIntosh et al. |
| 2003/0153338 | A1 | 8/2003 | Herz et al. |
| 2003/0235174 | A1* | 12/2003 | Pichna et al. ............... 370/338 |
| 2004/0006621 | A1 | 1/2004 | Bellinson et al. |
| 2004/0029553 | A1 | 2/2004 | Cain |
| 2004/0064351 | A1 | 4/2004 | Mikurak |
| 2004/0128231 | A1 | 7/2004 | Morita |
| 2004/0156312 | A1 | 8/2004 | Salonidis et al. |
| 2004/0162871 | A1 | 8/2004 | Pabla et al. |
| 2004/0165548 | A1* | 8/2004 | Backes ...................... 370/328 |
| 2004/0185777 | A1 | 9/2004 | Bryson |
| 2004/0192204 | A1 | 9/2004 | Periyalwar et al. |
| 2004/0260808 | A1 | 12/2004 | Strutt |
| 2004/0264466 | A1 | 12/2004 | Huang |
| 2005/0080872 | A1 | 4/2005 | Davis et al. |
| 2005/0153725 | A1 | 7/2005 | Naghian et al. |
| 2005/0157661 | A1* | 7/2005 | Cho .......................... 370/254 |
| 2005/0169209 | A1 | 8/2005 | Miu et al. |
| 2005/0169257 | A1 | 8/2005 | Lahetkangas et al. |
| 2005/0193221 | A1 | 9/2005 | Yoneyama |
| 2005/0203834 | A1 | 9/2005 | Prieston |
| 2005/0213503 | A1 | 9/2005 | Guo et al. |
| 2006/0002326 | A1 | 1/2006 | Vesuna |
| 2006/0085543 | A1 | 4/2006 | Hrastar et al. |
| 2006/0095582 | A1 | 5/2006 | Nitya et al. |
| 2006/0114853 | A1* | 6/2006 | Hasty et al. ................. 370/329 |
| 2006/0126504 | A1 | 6/2006 | Meier et al. |
| 2006/0167784 | A1 | 7/2006 | Hoffberg |
| 2006/0176829 | A1 | 8/2006 | McLaughlin et al. |
| 2006/0179143 | A1 | 8/2006 | Walker et al. |
| 2006/0187858 | A1 | 8/2006 | Kenichi et al. |
| 2006/0193295 | A1 | 8/2006 | White et al. |
| 2006/0224502 | A1 | 10/2006 | McGowan |
| 2007/0005797 | A1 | 1/2007 | Fontijn et al. |
| 2008/0040481 | A1 | 2/2008 | Joshi et al. |
| 2008/0167982 | A1 | 7/2008 | Leo et al. |

FOREIGN PATENT DOCUMENTS

| | | |
|---|---|---|
| WO | 9915960 | 4/1999 |
| WO | 03 037009 | 5/2003 |
| WO | 2004 001585 | 12/2003 |
| WO | 2006 004628 | 1/2006 |

OTHER PUBLICATIONS

Final Office Action dated Jun. 3, 2009 in U.S. Appl. No. 11/755,806.
Final Office Action dated Jun. 9, 2009 in U.S. Appl. No. 11/755,806.
Non-final Office Action dated Oct. 19, 2009 in U.S. Appl. No. 11/755,788.
Qui et al.. "Bandwidth in Ad Hoc Networks: A Price-Based Approach," 2003, IEEE, pp. 1-10.
Non-final Office Action dated Nov. 25, 2009 in U.S. Appl. No. 11/755,780.
Non-final Office Action dated Nov. 25, 2009 in U.S. Appl. No. 11/755,802.
D. Zhu et al., "QoS Aware Wireless Bandwidth Aggregation (QAWBA) by Integrating Cellular and Ad-hoc Networks.", Oct. 2004.
D. Zhu et al., "Using Cooperative Multiple Paths to Reduce File Download Latency in Cellular Data Networks.", Nov. 2005.
Non-Final Office Action dated Mar. 4, 2010 in U.S. Appl. No. 11/755,775.
Final Office Action dated Mar. 5, 2010 in U.S. Appl. No. 11/755,788.
Non-Final Office Action dated Mar. 22, 2010 in U.S. Appl. No. 11/755,782.
Non-Final Office Action dated Mar. 18, 2010 in U.S. Appl. No. 11/755,763.
Non-final Office Action dated Dec. 24, 2009 in U.S. Appl. No. 11/755,776.
Non-final Office Action dated Jan. 22, 2010 in U.S. Appl. No. 11/755,778.
Non-final Office Action dated Jan. 21, 2010 in U.S. Appl. No. 11/755,808.
Luo, Haiyun, Ramachandran Ramjee, Prasun Sinha, Li (Erran) Li, and Songwu Lu. "UCAN: A Unified Cellular and Ad-Hoc Network Architecture." MobiCom '03, Proceedings of the 9th Annual International Conference on Mobile Computing and Networking. New York, NY, USA: ACM Press, 2003, pp. 353-367.
Office Action dated Jun. 4, 2010 in U.S. Appl. No. 11/755,780.
Office Action dated Jun. 22, 2010 in U.S. Appl. No. 11/755,776.
Office Action dated Jul. 12, 2010 in U.S. Appl. No. 11/755,808.
Notice of Allowance dated Jul. 13, 2010 in U.S. Appl. No. 11/755,778.
Notice of Allowance dated Jun. 9, 2010 in U.S. Appl. No. 11/755,802.
Notice of Allowance dated Aug. 16, 2010 in Application No. 11/755,763.
Notice of Allowance dated Aug. 25, 2010 in U.S. Appl. No. 11/755,780.
Office Action dated Sep. 14, 2010 in U.S. Appl. No. 11/755,788.
Office Action dated Sep. 15, 2010 in U.S. Appl. No. 11/755,782.

* cited by examiner

| Node Name | Node Type | Location | File Requested for Transfer | Price | Service Level Objective | Current Quality of Service |
|---|---|---|---|---|---|---|
| | | | | | | |
| | | | | | | |

Figure 4 ered herein by reference in their entireties: Co-pending application Ser. No. 11/755,808, published as U.S. Pub. No. 2008/0299988; co-pending application Ser. No. 11/755,780, published as U.S. Pub. No. 2008/0298327, and co-pending application Ser. No. 11/755,775, published as U.S. Pub. No. 2008/0301017.

EFFICIENCY AND RESILIENCY ENHANCEMENTS FOR TRANSITION STATES IN AD HOC NETWORKS

CROSS-REFERENCE TO RELATED APPLICATIONS

This application is related to the following copending applications, all of which are incorporated herein by reference in their entireties: Co-pending application Ser. No. 11/755,808, published as U.S. Pub. No. 2008/0299988; co-pending application Ser. No. 11/755,780, published as U.S. Pub. No. 2008/0298327, and co-pending application Ser. No. 11/755,775, published as U.S. Pub. No. 2008/0301017.

FIELD OF THE INVENTION

The invention generally relates to systems and methods for a borrower of bandwidth in a bandwidth-sharing ad hoc network to transition from the ad hoc network to a direct network connection while preserving data downloaded over the ad hoc network and to systems and methods for a borrower to temporarily leave the ad hoc network while data is downloaded and cached for later transmission to the borrower.

BACKGROUND OF THE INVENTION

Mobile computing is becoming increasingly pervasive, and will approach ubiquity in wireless devices (e.g., notebook computers, smart phones, personal digital assistants (PDAs), etc.) over the next decade. One consistent trend in this mobile computing space is the fact that such platforms increasingly communicate over a variety of wireless protocols. Common protocols in use today for wireless data transfer include EV-DO, IEEE 802.11a/b/g, ZigBee® (registered trademark of ZIGBEE ALLIANCE of California), Bluetooth® (registered trademark of BLUETOOTH SIG, INC. of Delaware), and many other related protocols. By their very nature, differentials do exist, and will continue to exist, between the speed, or bandwidth, with which mobile devices can communicate with each other, vis-à-vis communications speeds with the broader network where a device's target data may reside.

It is often the case that a wireless device will have a relatively fast wireless connection to other local devices and a relatively slow wireless connection to the broader network (e.g., the Internet). For example, local wireless connections, provided by protocols such as IEEE 802.11a, 802.11b, 802.11g, 802.15.1 (e.g., Bluetooth®), and 802.15.4 (e.g., Zigbee®) provide fast data transfer rates of about 3 to 54 megabits per second (Mbps). However, such transfer protocols often have a limited maximum transmission range of about 30 to 300 ft. On the other hand, wireless telephony protocols (e.g., EV-DO, CDMA, EDGE, GPRS, etc.) have relatively large maximum transmission ranges on the order of miles, but only provide data transfer rates of about 10 kilobits per second (kbps) to 1 Mbps. Thus, while a user of a mobile device may enjoy relatively fast data transfer amongst local devices, the user is often limited to a slow wireless connection to the outside world (e.g., the Internet).

Accordingly, there exists a need in the art to overcome the deficiencies and limitations described hereinabove.

SUMMARY OF THE INVENTION

In a first aspect of the invention, a method comprises establishing an ad hoc network between at least a borrower and at least one lender of bandwidth and downloading requested data from a data source via the ad hoc network. The method further comprises leaving the ad hoc network while maintaining some of the downloaded requested data and reestablishing a connection to the data source for completing the downloading of the requested data.

In another aspect of the invention, the method comprises deploying an application in a computing environment, comprising a computer infrastructure being operable to establish an ad hoc network between at least a borrower and at least one lender of bandwidth. The computer infrastructure is further operable to maintain data which is already downloaded after a participant in the ad hoc network leaves the ad hoc network. The computer infrastructure is further operable to permit reestablishment of a connection to a data source for completing the downloading of the requested data.

In another aspect of the invention, a system comprises a server having a database containing data associated with at least one lender and a borrower in an ad hoc network, and at least one of a hardware and software component for establishing an ad hoc network between at least the borrower and the at least one lender of bandwidth. The system further comprises at least one of a hardware and software component for downloading requested data from a data source to the borrower via the ad hoc network and maintaining the downloaded data when the ad hoc network is permanently or temporarily disconnected. The system further comprises at least one of a hardware and software component for subsequently downloading a remaining portion of the requested data via a same type or different type connection.

In yet another aspect of the invention, a computer program product comprises a computer usable medium having readable program code embodied in the medium. The computer program product includes at least one component to establish an ad hoc network between at least a borrower and at least one lender of bandwidth. The computer program product further includes at least one component to download requested data from a data source to the borrower via the ad hoc network. The computer program product further includes at least one component to maintain at least a portion of requested data already downloaded. The computer program product further includes at least one component to complete the download of requested data to the borrower without re-downloading the requested data already downloaded.

BRIEF DESCRIPTION OF THE DRAWINGS

FIG. 4 shows an example table created and used in implementing aspects of the invention;

DETAILED DESCRIPTION OF EMBODIMENTS OF THE INVENTION

The invention generally relates to systems and methods for a borrower of bandwidth in a bandwidth-sharing ad hoc network to transition from the ad hoc network to a direct network connection while preserving data downloaded over the ad hoc network and to systems and methods for a borrower to temporarily leave the ad hoc network while data is downloaded and cached for later transmission to the borrower. By implementing the methods and systems of the invention, e.g., the permanent or temporary transition out of a bandwidth-sharing ad hoc network, multiple disparate wireless connections in conjunction with multiple devices using a variety of service providers, for example, can be used to create a single virtual fat pipe for transmission of data over a network. Furthermore, upon permanent or temporary transition out of the bandwidth-sharing ad hoc network, downloaded data is not lost, thus avoiding starting the download again from the beginning. The individuals who share their current connections, i.e., bandwidth, acting as gateway devices, are "lenders" of bandwidth; whereas, the individuals who require additional bandwidth are "borrowers". Accordingly, this invention adds resiliency and efficiency to the ad hoc network.

System Environment

Figure 1:
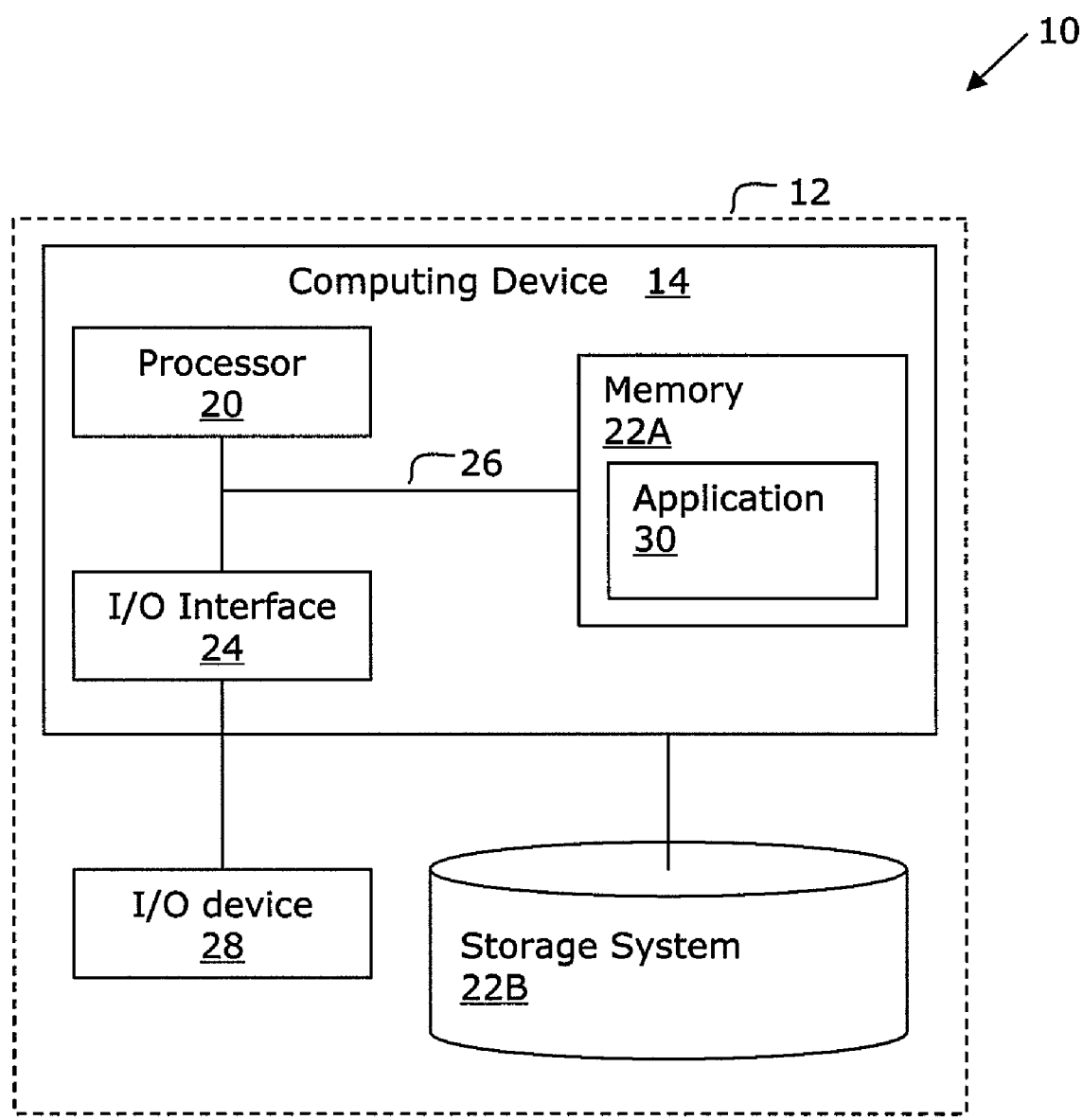
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to transition a borrower, temporarily or permanently, out of the ad hoc network, while ensuring that downloaded data is not lost, in accordance with the invention, e.g., process described herein. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

The processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster or mobile devices) that communicate over any type of communications link, such as a network, a shared memory, or the like, to perform the process described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

General Overview of Ad Hoc Networks

"Ad hoc" relationships are becoming increasingly important in the communal sharing of immediately available resources, and most particularly, the sharing of bandwidth. With the creation of peer-to-peer networks and bit torrent type services a file may be stored in a large number of locations to allow very fast download of the file in sections simultaneously from multiple locations. Groups of devices may congregate, or coexist, in one place and each may have limited bandwidth to the outside world. However, the groups of devices may have high bandwidth to other devices within close proximity. An example is a 802.11g local area connection that creates a high-speed wireless connection between two cellular phone devices within close range (high bandwidth), and wherein the cellular phones' cellular connection to the outside world may provide bandwidth at less than one percent of the 802.11g connection.

In embodiments of the invention, a borrower is able to transition out of a bandwidth-sharing ad hoc network, established in a peer-to-peer environment or a multiplexed environment, while preserving the data that has thus been downloaded and without requiring the entire data download to start from the beginning. In further embodiments, a borrower is able to temporarily leave the bandwidth-sharing ad hoc network, established in a peer-to-peer environment or a multiplexed environment, while the data download continues within the bandwidth-sharing ad hoc network.

In order to utilize the permanent or temporary transition out of a bandwidth-sharing ad hoc network, an ad hoc network may be created between a borrower node and one or more lender nodes. This process may include both an initial discovery mechanism of the proposed role each node may play, and a negotiation and acceptance of the agreed compensation scheme.

Figure 2A:
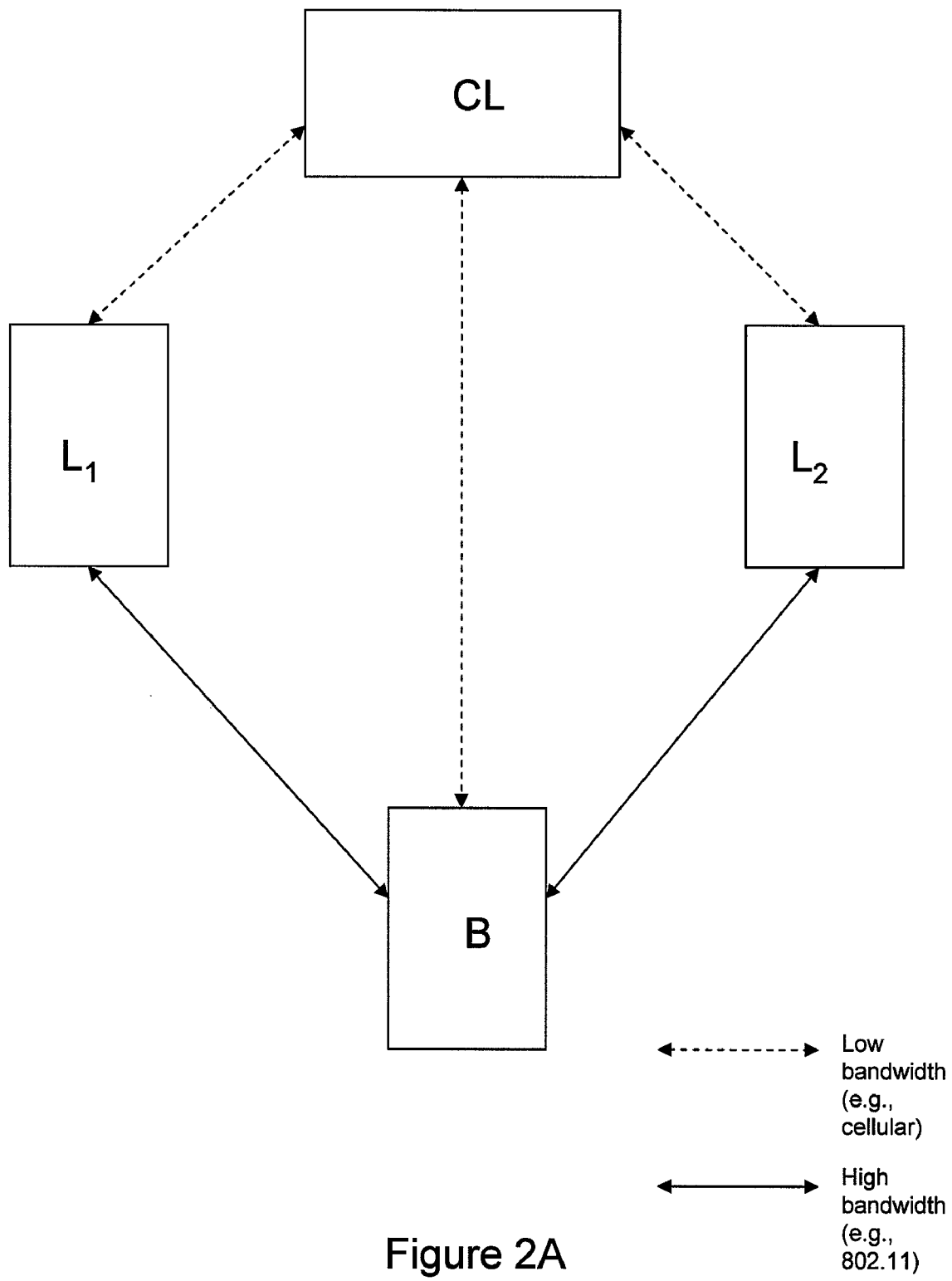
FIG. 2A is an overview of a peer-to-peer ad hoc network.

FIG. 2A is a general overview of a non-multiplexed, peer-to-peer (P2P) bandwidth sharing architecture which may be implemented with the systems and methods of the invention. An illustrative non-multiplexed, peer-to-peer (P2P) bandwidth sharing architecture is set forth in co-pending application Ser. No. 11/755,808.

In this implementation, a borrower B may request information, e.g., transfer of files, from a central location, CL (or distributed locations). To increase its bandwidth capacity, the borrower B may request bandwidth from any of the lenders, $L_1$ or $L_2$ via any known wireless protocol. By way of example, upon a broadcast request from the borrower B, any of the lenders, $L_1$ or $L_2$ may allow the borrower B to use their excess bandwidth for file transfers with the central location, CL (or distributed locations). Upon authorization, the lenders, via a wireless protocol, for example, will download information from the central locations, CL (or distributed locations), and send this information to the borrower, B, thus effectively increasing the borrower's bandwidth. It should be understood that data could be transferred from distributed locations, rather than the central location, CL.

Figure 2B:
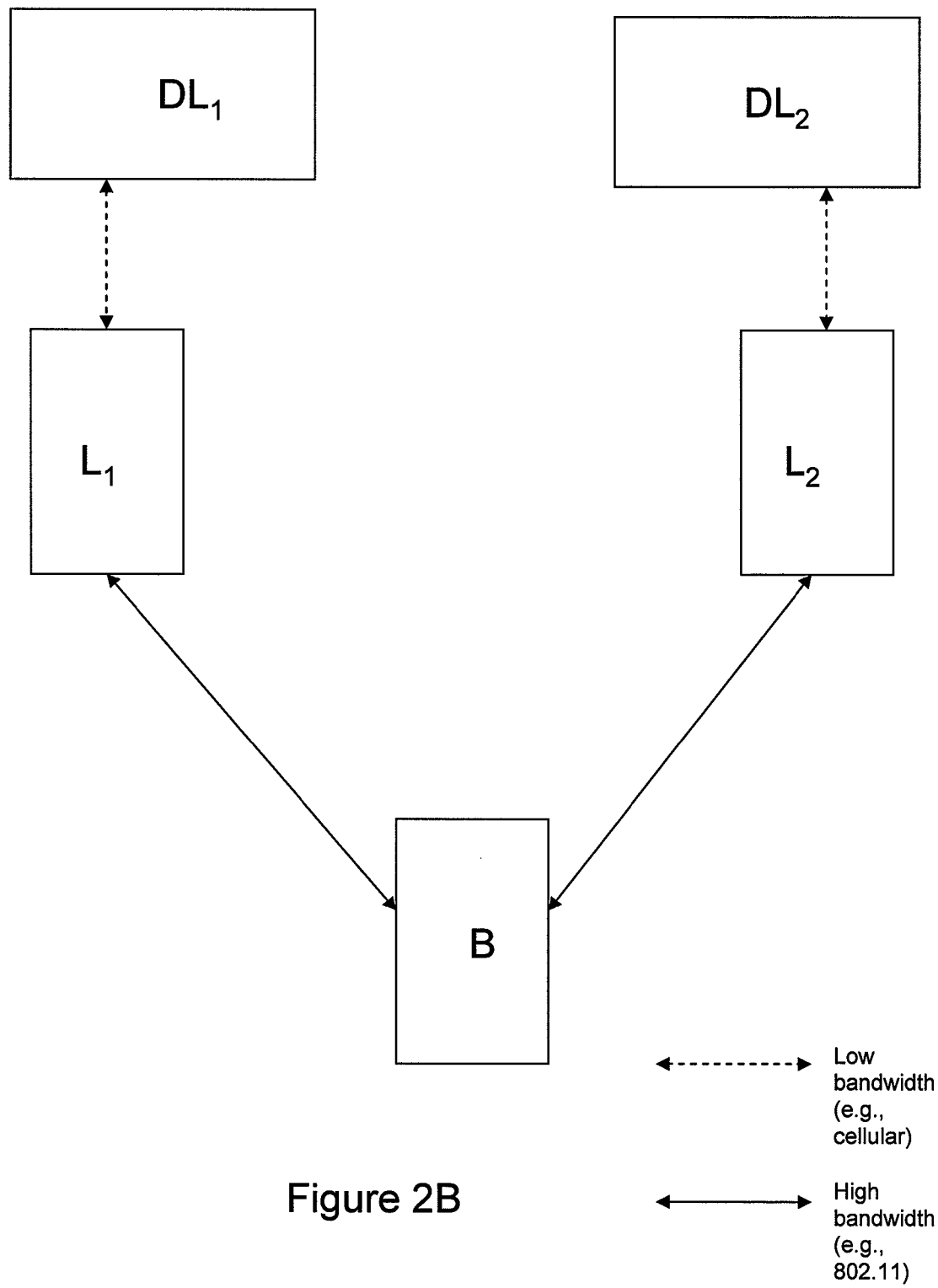
FIG. 2B is an overview of an alternative peer-to-peer ad hoc network.

FIG. 2B is a general overview of a multiple source peer-to-peer ad hoc network. In this implementation, a borrower B may request information, e.g., transfer of files, from distributed locations $DL_1$ and $DL_2$. Each distributed location $DL_1$ and $DL_2$ has a same copy of the requested data, and $L_1$ connects to $DL_1$ and $L_2$ connects to $DL_2$.

Figure 3:
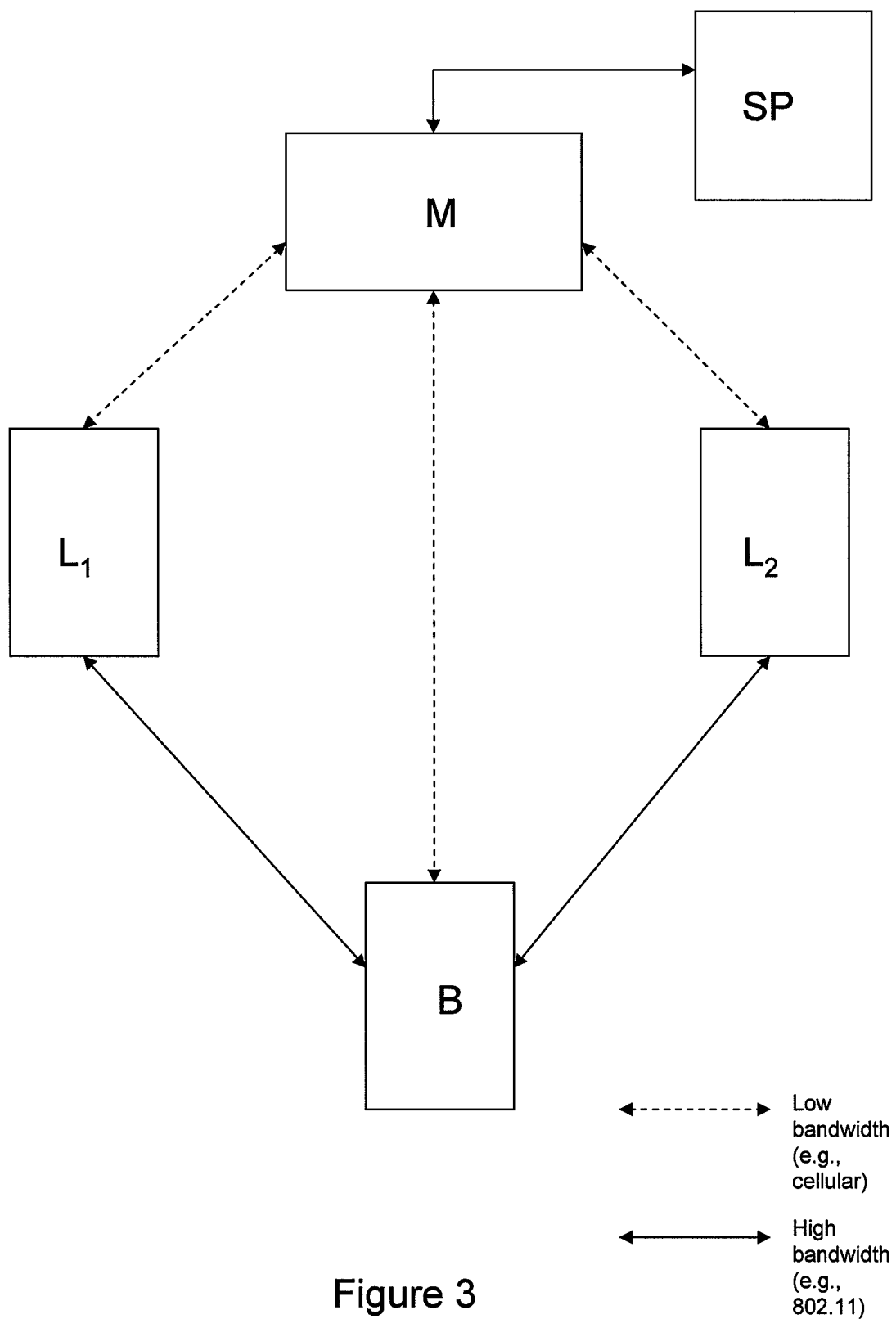
FIG. 3 is an overview of an ad hoc network implementing services of a multiplexer.

FIG. 3 is a general overview of a multiplexed gateway bandwidth sharing architecture which may be implemented with the invention. An illustrative multiplexed, gateway bandwidth-sharing architecture is set forth in co-pending application Ser. No. 11/755,780. In this implementation, a borrower B will request a multiplexer M to set up an ad-hoc network. The multiplexer M may communicate with a service provider, or data location, SP and connect to one or more lenders, L.sub.1 and L.sub.2, via a wireless network. In this implementation, the borrower may initially broadcast a message for lenders and, upon receipt of a response, transmit the lender locations and other criteria to the multiplexer. Once a network is established, the multiplexer will manage the network, including the bandwidth allocations provided by each of the lenders, for example.

Initial Formation of the Ad Hoc Network

In order to form a new ad hoc network, a borrower may scan all available potential lenders and prioritize the potential lenders for a data transfer. The formation of the ad hoc network, in embodiments, may use a 'borrower/lender' table as shown in FIG. 4. It is understood the table shown in FIG. 4 is one example of broadcasting bandwidth requests and obtaining lender information to select one or more lenders of bandwidth. For example, the table may take other formats, request additional information, etc. In this example, the borrower or multiplexer will broadcast the table to potential lenders which, in turn, will return the table, with information pertinent to the lender, to the borrower or the multiplexer. Using this information, the borrower or lender can establish an ad hoc network with lenders that meet certain criteria, e.g., reliability, speed, availability and/or costs.

In the borrower/lender table of FIG. 4, the "Node Name" column may be the unique identifier of a node such as the borrower and lenders. For example, this could be a hostname, a Bluetooth® name (Bluetooth is a trademark of Bluetooth Sig, Inc. in the United States, other countries, or both) name or any other information that can uniquely describe the node. The "Node Type" column may describe whether this node is a borrower, a lender, or a multiplexer. The "Location" column may be an IP address, Wi-Fi address, Bluetooth address, MAC address or any other attribute that can be used to locate the node. The "File Requested for Transfer" column may be used to store information about the file (or piece of file) to be transferred. This may be an HTTP address, an FTP address or other information to describe where and how the data is to be found. The "Service Level Objective" column may describe the negotiated service levels of the node. For example, the requested bandwidth, the availability of the node, reliability and so forth. The "Current Quality of Service" column may contain the current quality of service (QoS) of the node. The QoS information may contain a status of the node, e.g., how well the service levels are being met, the current transfer rate, or the current progress of the file download.

The "Price" column may be a price set by the lender to use the lender's bandwidth. The price may be stated in a price/data volume, a price/time, a price/data volume and a price/time, a price/time with a data cap, or a one-time price. Additionally, the price may be stated as a number of minutes to be used in a wireless service plan or any other charging mechanism.

In aspects of the invention, a borrower and a lender may not see all of the table on their respective devices, and some of the table information may be generated automatically. The user interface may require less display space and may require less user input. For example, the location of a lender's device or borrower's device may be known by the device itself. Thus, the user may not need to complete this portion of the table. Rather, the information for that portion of the table would be automatically completed by the device. Furthermore, the automatic generation of the information in the table may also apply to the Node Type, Node Name, Service Level Objective, Price and Current Quality of Service columns. For example, a borrower may have preset levels of service level objectives that they require whenever they borrow bandwidth, so that generation of the Service Level Objective column may be performed automatically by the borrower's device. Additionally, a potential lender may have a set price for lending bandwidth already input into their device, such that the Price column information is automatically generated.

In one illustrative example, a borrower may initially generate the table by clicking on an icon, and when prompted, input the File Requested for Download information. The borrower's device could generate the remaining portions of the information in the table. When a potential lender receives the borrower's request, their device may simply prompt for a decision to be a lender. If the potential lender answers "yes", then their device may prompt the potential lender for a price. As set forth above, the rest of the information in the table may be generated automatically. An illustrative formation and rearrangement of a bandwidth-sharing ad hoc network architecture is set forth in co-pending application Ser. No. 11/755,775.

A borrower completes one line of a new table to describe their node. At this stage, the node name, type, location and file requested columns may be completed. For example, as shown in TABLE 1, Borrower 1 would complete the table showing current location on a Wi-Fi Network called 'Airport', with IP address 192.168.2.3, to download a file from http://location.com/myfile. At this stage, the other columns may remain blank.

The borrower broadcasts the table to request potential lenders to form an ad hoc network. This broadcast, in embodiments, includes the table for completion by any available nodes within range that could be used to form the ad hoc network. The table may be broadcast over the wireless network using a plurality of different protocols such as Bluetooth®, Wi-Fi or Cellular. The table can be represented in binary, xml, text or other data format optimized for the type of data transport.

A node receives the broadcast, including the table, and a potential lender completes necessary information in the table, including the price information. For example, as shown in TABLE 2, below, Lender 1 is a node on the same Wi-Fi network 'Airport' and is able to perform lender functions for $5/MB at a rate of 1 kb/second. The "File Requested for Transfer" column may remain blank, because the borrower has not yet decided which of the potential lenders will be part of the bandwidth-sharing ad hoc network. Additionally, the "Current Quality of Service" column may remain blank, because no bandwidth sharing has occurred yet.

TABLE 2

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |
| Lender 1 | Lender | Wi-Fi network 'AIRPORT' IP Address: 192.168.2.10 | NA | $5/MB | Can download at 1 kb/sec | NA |

Lender 1 may send back this information, including the pricing information, to Borrower 1. The filling and retransmitting of the table, may be repeated for other potential lenders of bandwidth in the ad hoc network. In this manner, the table may gradually be built up such that the borrower can select lenders to use.

For example, as shown below in TABLE 3, additional nodes, Lender 2 and Lender 3, provided the information for each lender, and this information has been tabulated by the borrower, upon receipt. In this example, Lender 2 is on a Bluetooth Network and can download the file requested for transfer at a price of $10/MB and a rate of 2 kb/second. Additionally, Lender 3, is on some other protocol, and can download the file requested for transfer at a price of $10/MB and a rate of 5 kb/second.

TABLE 1

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |

TABLE 3

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |
| Lender 1 | Lender | Wi-Fi network 'AIRPORT' IP Address: 192.168.2.10 | NA | $5/MB | Can download at 1 kb/sec | NA |
| Lender 2 | Lender | Bluetooth name Pairing key: 1234 | NA | $10/MB | Can download at 2 kb/sec | NA |
| Lender 3 | Lender | Other Protocol 'XXX' Name: 19283 | NA | $10/MB | Can download at 5 kb/sec | NA |

To initiate the download, the borrower may determine, from the information in the table, including the price information, which lenders to use and for which portions of the data. The borrower may borrow bandwidth from the lenders to complete the download.

In a multiplexed environment, the use of a multiplexer may be more viable than the borrower, itself, managing multiple separate lenders. The addition of the multiplexer may allow more functionality to be pushed to the multiplexer, such that the borrower may need to only use the multiplexer to receive information about which lenders to use. In this manner, the multiplexer acts as a gateway for a borrower such that the management of file chunking and distribution of data to each lender may be performed by the multiplexer. Thus, the multiplexer has the job of managing associated lenders and directing separate data streams back to the borrower. The multiplexer may charge a fee for this service.

Furthermore, in a first scenario, the multiplexer may be a member of the local bandwidth-sharing ad hoc network, capable and willing to serve as a multiplexer (i.e., has a large bandwidth connection to the Internet, or some other network, and is an intelligent device capable of performing the multiplexing functions). Additionally, in a second scenario, the multiplexer may be a multiplexer service, for example, an online multiplexer service which is outside of the bandwidth-sharing ad hoc network.

While borrowing bandwidth in a bandwidth-sharing ad hoc network, either in a peer-to-peer environment or in a multiplexed environment, conditions may change such that a borrower may decide to stop borrowing bandwidth. Furthermore, the borrower may decide to stop borrowing bandwidth completely or permanently, or temporarily or for a finite period of time.

It should be understood that the terms "permanently" and "completely" with regards to transitioning out of the ad hoc network may not be permanent or complete. Rather, these terms are used to describe transitioning out of the ad hoc network for that particular data download for which the ad hoc network was initially established. At a later time the borrower may reform or reestablish an ad hoc network to perform another download. Additionally, in embodiments, a borrower may transition out of an ad hoc network to complete a download via a direct network connection, but later lose the direct connection. In this situation the borrower may rejoin or reestablish the ad hoc network to complete the desired download, even though the borrower previously "permanently" transitioned out of the ad hoc network. In the situation where a borrower transitions out of the ad hoc network to a direct connection, and subsequently loses the direct connection, the borrower will know the stopping point of the download over the direct connection. Thus, the borrower may reestablish an ad hoc network to complete the download by instructing the lenders or multiplexer to begin the download from the borrower's download stopping point. Thus, in any scenario, data downloaded via the ad hoc network is not lost.

Transitioning Out of an Ad Hoc Network

The present invention provides advanced methods to allow intelligent data transition states as borrowers enter and leave an ad hoc network. Additionally, the invention includes a scenario where it may be more beneficial for a borrower to stop participating in an ad hoc network and migrate to a non ad hoc network without losing the data downloaded to that point.

By way of example, consider a laptop in an airport that has chosen to become a borrower in an ad hoc network because the borrower needs to download a large file and there is no direct fast connection to the Internet. In this scenario, the borrower may set up an ad hoc network with lenders, agree to a price for shared bandwidth and start to download the file. Now consider the scenario where the borrower enters an area of the airport with a fast wireless connection such that it may no longer make sense to participate in the ad hoc network. For example, it may now be faster, cheaper or more reliable to download the file directly over the new direct connection.

With a first method, in embodiments, a borrower may determine whether they should leave the ad hoc network and continue downloading a file via a direct connection to the data source (or a multiplexer connected to the data source). A borrower may be able to connect via a direct network communication to the data source, with more desirable bandwidth, price or quality of service parameters, such that it may no longer be necessary or desired to use the bandwidth-sharing ad hoc network. For example, a borrower may come in contact with a fast network connection, perhaps when the borrower is plugged into an Ethernet socket in the wall. In this scenario, it may be beneficial for the borrower to detach themself from the bandwidth-sharing ad hoc network and continue data transfer directly from the data source via the direct network connection.

A key to this transition out of the bandwidth-sharing ad hoc network is to ensure that the data downloaded thus far using the ad hoc network is not lost during the transition out of the ad hoc network, so that the borrower need not start the download again from the beginning. There are two approaches to solving this problem depending upon the ad hoc network environment. The first approach, in embodiments, is relevant when the borrower is connected to an ad hoc network without using a multiplexer. The second approach, in embodiments, is relevant when the borrower is connected to an ad hoc network utilizing a multiplexer.

Transitioning in a Peer-to-Peer Environment

The first approach, in embodiments, may be utilized when a borrower is connected to the ad hoc network in a peer-to-peer environment (i.e., without using a multiplexer). In a peer-to-peer environment, the borrower may communicate with lenders in the ad hoc network directly and dictate which lenders download which "chunks" of a data stream on behalf of the borrower. In embodiments, when the borrower detects that the ad hoc network may no longer be needed, the borrower may signal the lenders to transfer to the borrower any data already received by the lenders from the data source, and instruct the lenders not to download anymore data from the data source.

Alternatively, the borrower may direct the lenders to not send data already received from the data source. As the borrower now has a direct network connection, it may be faster for the borrower to download this data from the data source even though the lenders may have already downloaded this data from the data source. That is, while the connection to the lenders in the ad hoc network is a high bandwidth connection, this connection may still be slower than the borrower's now available direct network connection.

Once the borrower has waited for all of the data chunks to be transferred from the lenders to the borrower, the borrower may signal the lenders to ask how much data has been downloaded, or the download stopping points, such that the borrower may determine where to start data transfer again from to complete the desired download. The borrower may now leave the bandwidth-sharing ad hoc network and finish downloading the file using their newly established direct network connection.

Figure 5:
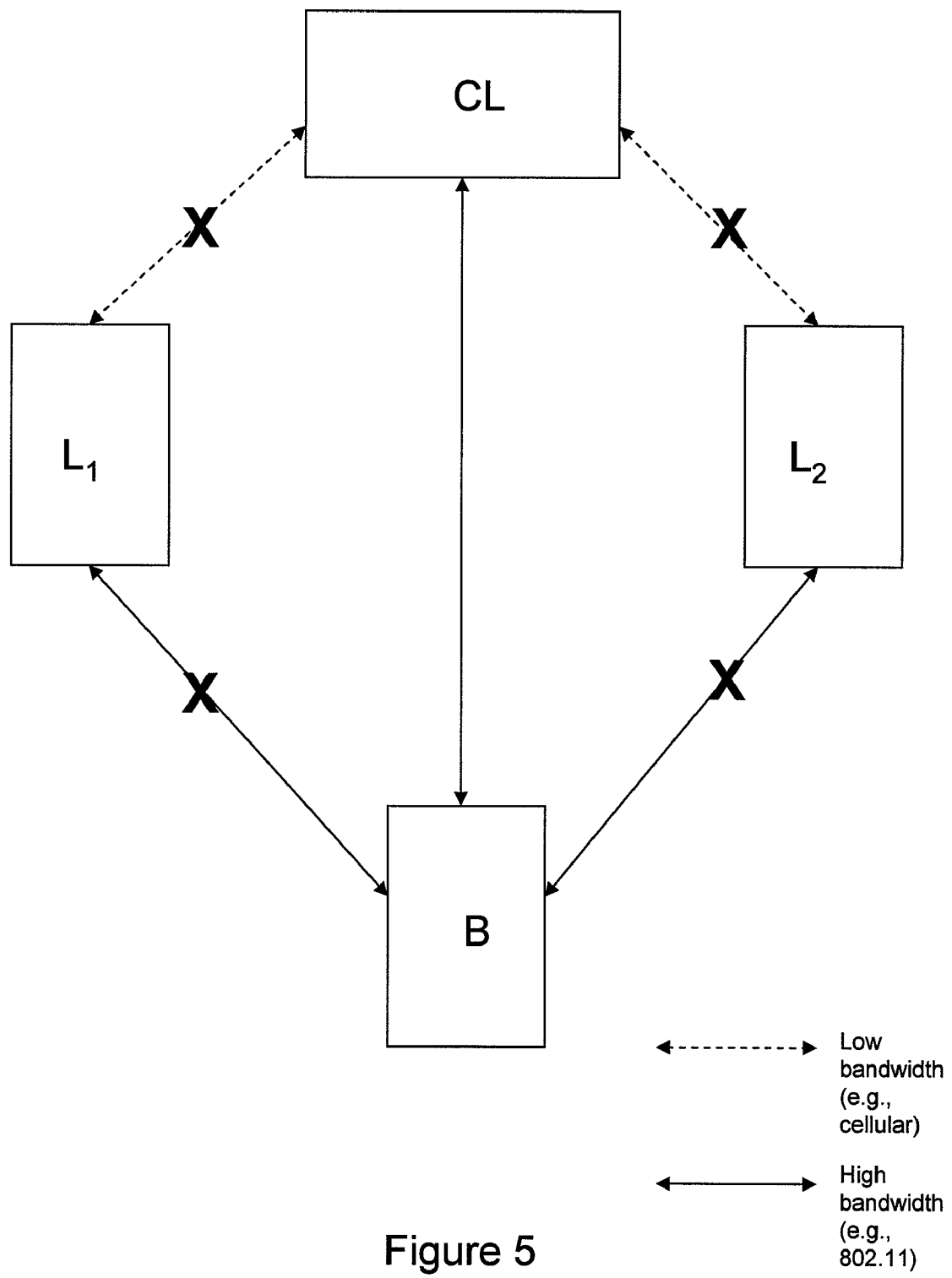
FIG. 5 is an overview of a transition out of an ad hoc network in a peer-to-peer environment, according to aspects of the invention.

FIG. 5 shows an overview of an aspect of the invention where a borrower B has transitioned out of the bandwidth-sharing ad hoc network in a peer-to-peer environment and established a direct connection to the data location MP. As is shown in FIG. 5, the high bandwidth ad hoc network connections between the borrower B and the lenders $L_1$ and $L_2$ have been severed. This is represented by the "X" across the connections. Additionally, in embodiments, the low bandwidth connections between the lenders $L_1$ and $L_2$ and the central data location CL have also been severed. Furthermore, as shown in FIG. 5, in embodiments, the borrower B has established a high bandwidth connection to the central data location CL.

Transitioning in a Multiplexed Environment

The second approach, in embodiments, may be utilized when the borrower is connected to an ad hoc network using a multiplexer to manage the download of files via multiple lenders. As described above, the multiplexer may be outside the ad hoc network, e.g., an online multiplexing service, or the multiplexer may be within the ad hoc network, e.g., a lender who has decided to act as a multiplexer.

With the first situation, the multiplexer is outside the ad hoc network, e.g., an online multiplexing service. In embodiments, when the borrower detects that the ad hoc network is no longer needed, the borrower may signal the multiplexer to inform the lenders to transfer to the borrower any data already received by the lenders through the multiplexer from the data source and tell the multiplexer not to download any more data from the data source to the lenders. Again, as described above, the borrower may instruct the multiplexer to direct the lenders to not send the data already received from the multiplexer. Once the borrower has waited for all of the data chunks to be transferred from the lenders to the borrower, the borrower may signal the multiplexer to ask how much data has been downloaded, or the download stopping points, such that the borrower may determine where to restart data transfer from to complete the desired download. As the multiplexer up to this point has managed the data chunking, the multiplexer knows each lender's respective download stopping point. Thus, the borrower may not need to ask the individual lenders their respective stopping points, or how much data has been downloaded. Rather, in embodiments, the multiplexer may transmit the lenders' respective stopping points to the borrower, so that the borrower may determine where to restart their download. The borrower may now leave the ad hoc network and finish downloading the file using their newly established direct network connection.

Figure 6:
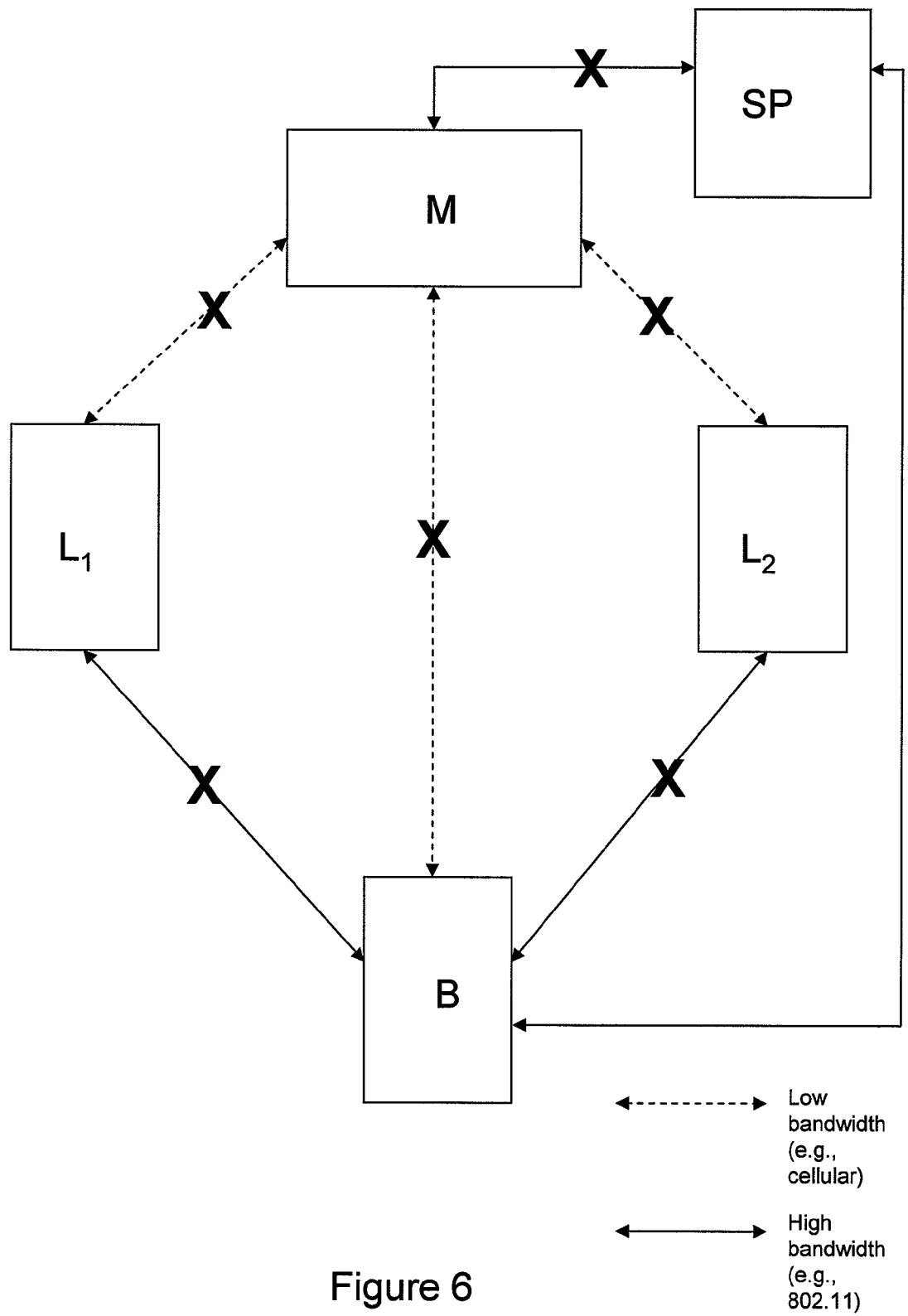
FIG. 6 is an overview of a transition out of an ad hoc network in a multiplexed environment, according to aspects of the invention.

FIG. 6 shows an overview of an aspect of the invention where the borrower B has transitioned out of the bandwidth-sharing ad hoc network in a multiplexed environment and established a direct connection to the data location SP. As shown in FIG. 6 the high bandwidth connections between the borrower B and the lenders $L_1$ and $L_2$ have been severed. Additionally, the low bandwidth connections between the multiplexer and the lenders $L_1$ and $L_2$ have been severed. Further, the high bandwidth connection between the multiplexer and the data location SP has been severed. Furthermore, as is shown in FIG. 6, the borrower B has established a high bandwidth direct connection with the data location SP.

However, when the multiplexer is outside of the ad hoc network, e.g., a service provider on the Internet rather than a wireless lender node which has been promoted to a multiplexer, it may be preferred to continue to use the multiplexer even through the borrower may have a direct network connection. Again, with this scenario, the multiplexer is not running locally. In this scenario, in embodiments, the borrower may elect to signal the multiplexer that it wishes to connect to the multiplexer directly over the new direct connection, rather than using the multiple lenders of the ad hoc network. The multiplexer may then signal to the lenders to stop the current data transfer. The multiplexer may then continue to download the data from the data source from the lenders' respective stopping points on behalf of the borrower. However, rather than 'chunking up' the data and sending it to multiple lenders, the multiplexer may now send the data directly to the borrower via the direct connection. This embodiment may allow the use of a multiplexer in a direct connection scenario.

In embodiments, continuing to use the multiplexer in this scenario may be preferred, because the borrower may then not need to continue to receive the data already sent from the multiplexer to the individual lenders. Rather, as the multiplexer has already received this data from the data source, the multiplexer may now send this data directly to the borrower over the newly established direct connection, which may have a larger bandwidth than the high bandwidth connections of the ad hoc network between the borrower and lenders. In other words, it may be faster for the borrower to receive data directly from the multiplexer, even though the same data has already been transferred to the individual lenders and is ready to be transferred to the borrower over the ad hoc network.

Additionally, in embodiments, continuing to use the multiplexer in this scenario may be preferred, because the borrower may not need to receive the stopping points of the individual lenders from the multiplexer. Rather, because the multiplexer, up to this point, has been responsible for managing the download, including the "chunking up" of the data, the multiplexer may determine the lenders' respective stopping points, or how much data has been downloaded thus far, such that the multiplexer may determine where to restart the data download from.

Furthermore, in embodiments, if the borrower decides to continue to use the multiplexer over the direct connection, the borrower or the multiplexer may decide to renegotiate the pricing for the multiplexing service. While using the direct connection, the borrower is still utilizing the multiplexer, but to a lesser extent. Because the multiplexer is transmitting the data directly to the borrower over the direct connection, the multiplexer is no longer "chunking up" the data, sending the data to the individual lenders, and keeping track of each lender's downloading progress. Thus, the multiplexer may be performing a slightly different, and less demanding service. Therefore, the borrower or the multiplexer may renegotiate the cost of the multiplexing service.

Figure 7:
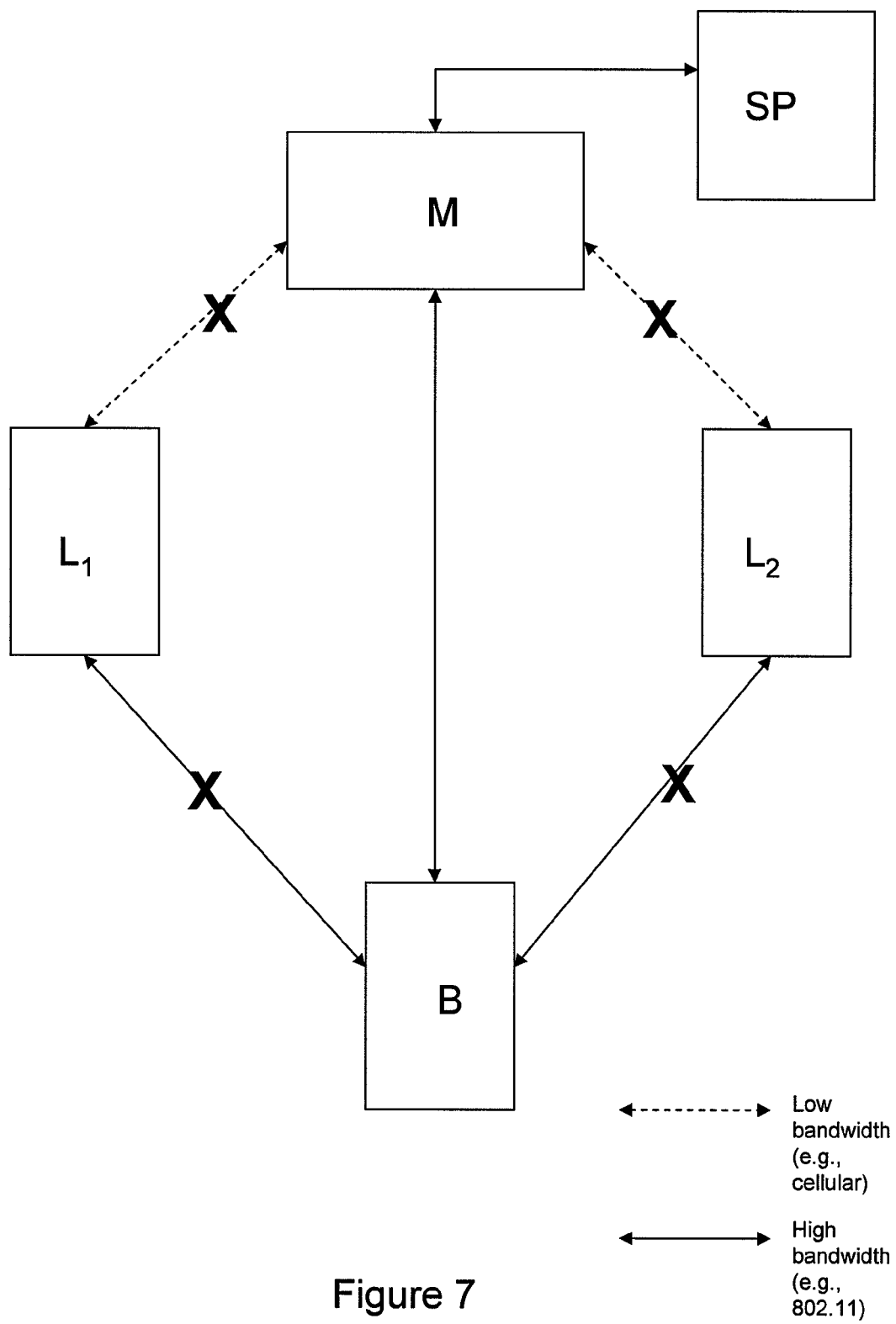
FIG. 7 is an overview of a transition out of an ad hoc network in a multiplexed environment, according to aspects of the invention.

FIG. 7 shows an aspect of the invention where the borrower B has transitioned out of the bandwidth-sharing ad hoc network and established a direct connection to the multiplexer. As is shown in FIG. 7, the high bandwidth connection between the borrower B and the lenders $L_1$ and $L_2$ have been severed (as indicated by the "X"s). Additionally, the low bandwidth connections between the multiplexer M and the lenders $L_1$ and $L_2$ have been severed. Further, the borrower B has established a high bandwidth connection to the multiplexer M. Additionally, the high bandwidth connection between the multiplexer M and the data location SP remains so that the borrower B is connected to the data location SP through the multiplexer M.

However, in embodiments, it may not be preferred to continue using the multiplexer over the direct connection, as the multiplexer may still charge for using their service. Even if the price is renegotiated, as explained above, the borrower may still be paying for a service. If the borrower uses the direct connection without using the multiplexer, the borrower may no longer need to pay for the multiplexing service. However, if the borrower does not continue to utilize the multiplexer, the borrower may need to receive the individual lenders' download stopping points from the multiplexer to determine where to restart the download from.

With a second situation, the multiplexer is a member of the ad hoc network, e.g., an individual lender that is functioning as a multiplexer. With this situation, in embodiments, when the borrower detects that the ad hoc network may now no longer be needed or desired, the borrower may send a signal to the multiplexer to instruct the lenders to transfer to the borrower any data already received by the lenders through the multiplexer from the data source, and instruct the multiplexer not to download any more data from the data source to the lenders. Once the borrower has waited for all of the data chunks to be transferred from the lenders to the borrower, the borrower may signal the multiplexer to determine the lenders' respective stopping points, such that the borrower may determine where to restart data transfer from to complete the desired download. As the multiplexer up to this point has managed the data chunking, the borrower may not need to ask the individual lenders how much data has been downloaded. Rather, in embodiments, the multiplexer may transmit each lender's respective stopping point to the borrower, so that the borrower may determine where to restart their download. The borrower may now leave the ad hoc network and finish downloading the file using their newly established direct network connection.

With this situation, the borrower may not want to continue using the local ad hoc network multiplexer with the borrower's now available direct network connection (having a high bandwidth). That is, the borrower's connection to the multiplexer within the ad hoc network and/or the multiplexers connection to the data source may be lower bandwidth connections, as compared to the borrower's now available direct network connection.

This system and method, in embodiments, may be implemented through the use of the ad hoc network, multiplexers and state information table as set forth above. The use of the state table may be used to perform the signaling between borrower, lender and multiplexer.

For example, as shown below in TABLE 4, if a borrower decides to leave the ad hoc network and use a direct connection, the borrower may broadcast a state table with the following information:

TABLE 4

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | USE DIRECT CONNECTION |
| Lender 1 | Lender | Wi-Fi network 'AIRPORT' IP Address: 192.168.2.10 | NA | $5/MB | Can download at 1 kb/sec | NA |

TABLE 4-continued

| Node Name | Node Type | Location | File Requested for Transfer | Price | Service Level Objective | Current Quality of Service |
|---|---|---|---|---|---|---|
| Lender 2 | Lender | Bluetooth name Pairing key: 1234 | NA | $10/MB | Can download at 2 kb/sec | NA |
| Lender 3 | Lender | Other Protocol 'XXX' Name: 19283 | NA | $10/MB | Can download at 5 kb/sec | NA |

As shown in TABLE 4, the borrower's "Current Quality of Service" cell has been modified to "USE DIRECT CONNECTION". In a peer-to-peer environment, the individual lenders may receive the broadcasted state table, and may stop downloading information from the data source, transmit the data already downloaded to the borrower, and transmit to the borrower their respective download stopping points.

In a multiplexed environment, in embodiments, the borrower may transmit a similar state table (with a multiplexer identified in the "Node Type" column), with a modified "Current Quality of Service" cell to request use of a direct connection. Further, the borrower may also transmit an indication of whether the borrower will continue to use the multiplexer in conjunction with the borrower's now available direct network connection. The multiplexer may receive this request and instruct the lenders to stop participating in the ad hoc network.

Additionally, in embodiments, any renegotiation of prices, as described above and further below, may be performed via transmitting of the state table.

Temporarily Leaving the Ad Hoc Network

The invention is also directed to a caching mechanism, or store-and-forward functionality, of lenders and/or multiplexers such that a borrower may temporarily leave the ad hoc network without causing associated lenders and/or a multiplexer to stop downloading data on the borrower's behalf.

Consider the example of a borrower having a laptop at the airport. The borrower may need to reboot their computer or otherwise go off line for a period of time (perhaps to go through airport security). In this situation, the ad hoc network would be disbanded and data may be lost. The present invention, in embodiments, solves the problem of being able to maintain the ad hoc network while the borrower is off line, as well as allowing the associated lenders and/or the multiplexer to continue their downloading on behalf of the borrower.

With a second method, in embodiments, a borrower may temporarily leave the ad hoc network without having to cause the lenders and/or the multiplexer associated with the borrower to stop the data transfer. With this method, the borrower may elect to leave the ad hoc network for a period of time, for example, to reboot or to go through airport security, or some other reason. This method, in embodiments, is applicable to the peer-to-peer environment and both multiplexed environments, where the multiplexer is outside of the ad hoc network and where the multiplexer is within the ad hoc network.

In this scenario, the borrower may signal the lenders, or the multiplexer, to state an expected amount of time that the borrower is going to be unavailable. Alternatively, in embodiments, the borrower may send a "temporarily unavailable" signal.

Temporarily Leaving in a Peer-to-Peer Environment

With a bandwidth-sharing ad hoc network established in a peer-to-peer environment, in embodiments, the lenders may receive the unavailable signal from the borrower and continue to download or upload data from the data source. However, the lenders may not then send the data to the borrower. Rather, in embodiments, the lenders may store, or cache, the data locally, such that it is available to be transmitted to the borrower when the borrower rejoins the ad hoc network. This caching may allow the ad hoc network to continue functioning while the borrower is temporarily off line. The amount of time that the borrower goes off line may dictate the amount of local storage necessary for the lenders to continue caching. In embodiments, a lender may elect to only cache for a small amount of time to save local space, in which case the lender may continue downloading until the cached data reaches a certain threshold and then stop.

Additionally, in embodiments, this situation may prompt a renegotiation of pricing with each lender for the temporary storage of cached data. That is, each lender may now be performing additional tasks to those initially agreed upon, e.g., caching data, such that the lenders may demand more compensation.

Figure 8:
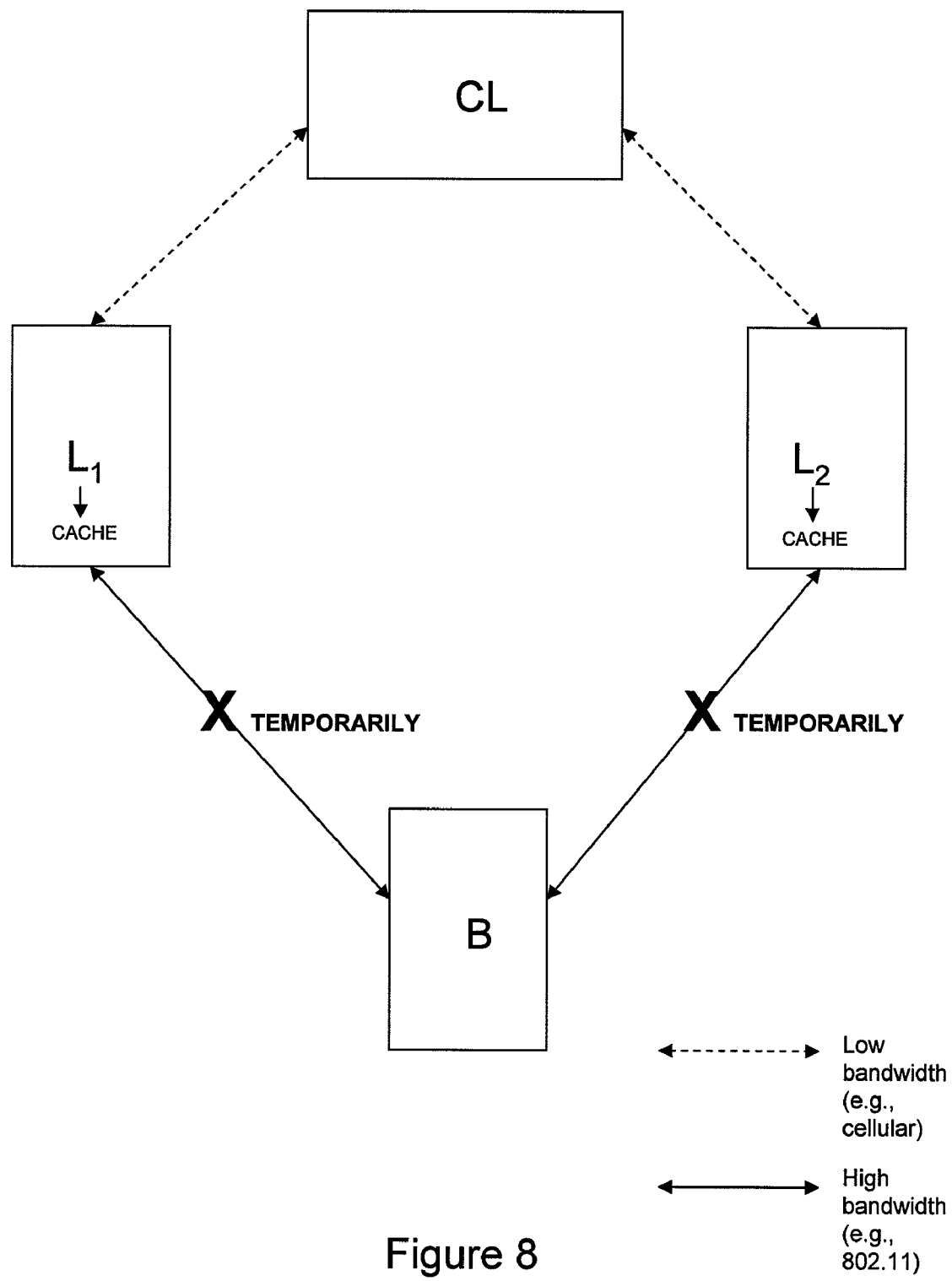
FIG. 8 is an overview of temporarily leaving an ad hoc network in a peer-to-peer environment, according to aspects of the invention.

FIG. 8 shows an aspect of the invention where the borrower B has temporarily left the bandwidth-sharing ad hoc network established in a peer-to-peer environment. As is shown in FIG. 8, the high bandwidth connections between the borrower B and the lenders $L_1$ and $L_2$ have been temporarily severed (as indicated by "$X_{TEMPORARILY}$"). Further, the lenders $L_1$ and $L_2$ remain connected via the low bandwidth connection to the data location CL, and continue to download data from the data location CL. Additionally, as shown in FIG. 8, the lenders $L_1$ and $L_2$ each locally cache the data received from the central data location CL.

Temporarily Leaving in a Multiplexed Environment

With a bandwidth-sharing ad hoc network established in a multiplexed environment, in embodiments, the multiplexer, upon receiving the unavailable signal from the borrower, may continue to download or upload data from the data source. Further, in embodiments, the multiplexer may continue to transmit this data to the individual lenders. However, the multiplexer may instruct the individual lenders to no longer send the data to the borrower. Rather, in embodiments, the data may be locally cached by the lenders, such that it is available to transmit to the borrower when the borrower rejoins the ad hoc network.

Figure 9:
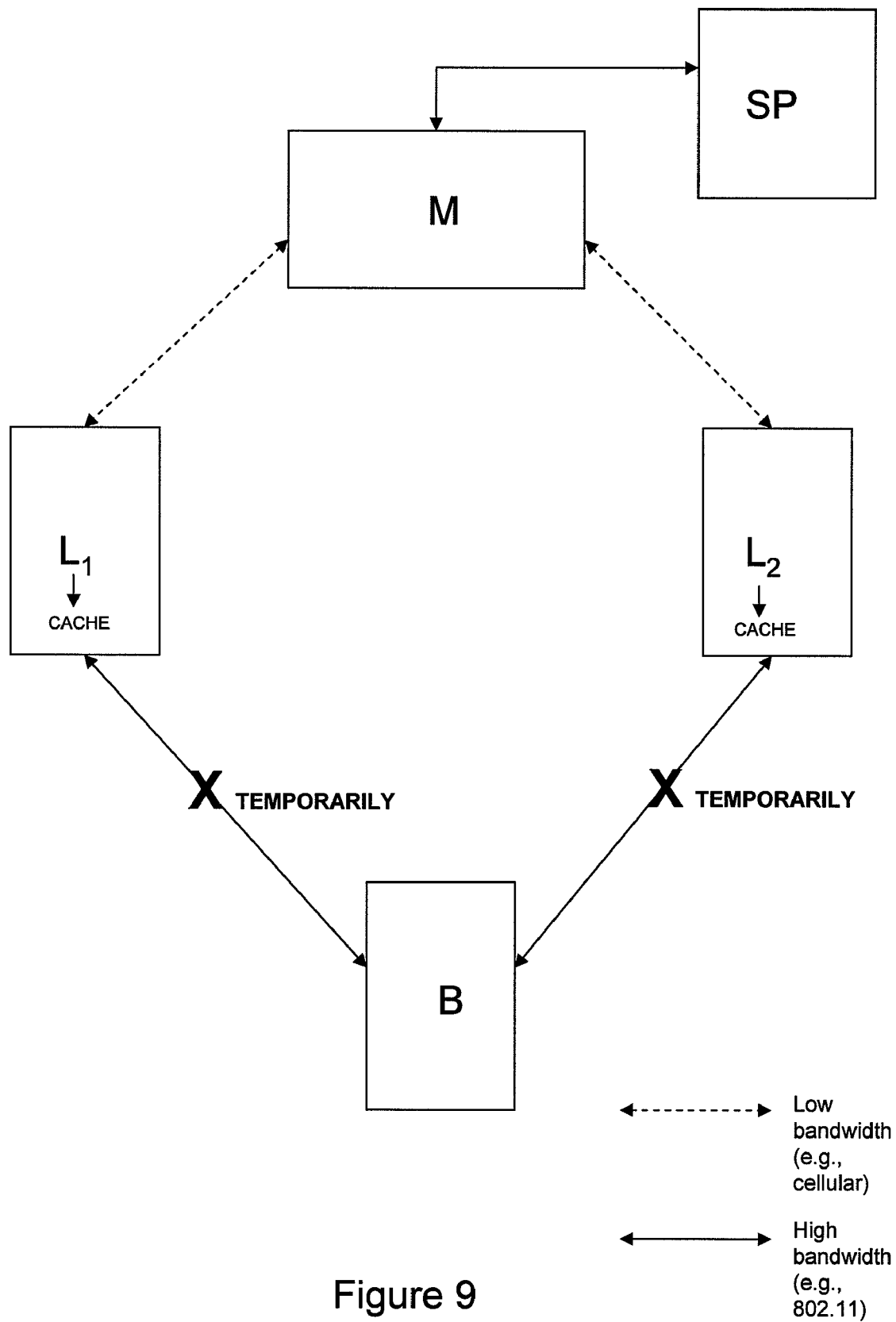
FIG. 9 is an overview of temporarily leaving an ad hoc network in a multiplexed environment, according to aspects of the invention.

FIG. 9 shows an aspect of the invention where the borrower B has temporarily left a bandwidth-sharing ad hoc network established in a multiplexed environment. As is shown in FIG. 9, the high bandwidth connections between the borrower B and the lenders $L_1$ and $L_2$ have been temporarily severed. Additionally, the multiplexer remains connected via the high bandwidth connection to the data location SP, and continues to download data. Further, the lenders remain connected via the low bandwidth connection to the multiplexer M and continue to receive data from the multiplexer M. Additionally, as is shown in FIG. 9, the lenders $L_1$ and $L_2$ each locally cache the data received from the multiplexer M.

Alternatively, in embodiments, the multiplexer may continue to download or upload data from the data source. However, rather than transmitting the data to the lenders so that they may cache the data, in embodiments, the multiplexer may locally cache the data locally until the borrower is available again. Once the borrower is available again, in embodiments, the multiplexer may then send the cached data to the individual lenders so that the lenders may transmit the data to the borrower. Using this embodiment may allow the caching of data in one place, rather than caching the data on a number of individual lenders' respective storage devices. This caching may allow the ad hoc network to continue functioning while the borrower is temporarily unavailable. The amount of time that the borrower goes off line may dictate the amount of local storage necessary at the multiplexer, to continue caching.

Additionally, in embodiments, this situation may prompt a renegotiation of pricing for the temporary storage of cached data. However, in the multiplexed environment, the borrower may only need to renegotiate pricing with the multiplexer. That is, in embodiments, as the multiplexer may be managing the download, and is thus responsible for negotiating arrangements with the individual lenders, the borrower may only need to negotiate a new pricing with the multiplexer. In embodiments, if the lenders continue to cache data, the multiplexer may need to negotiate a new pricing with each individual lender for the caching of data.

However, in alternative embodiments, where the multiplexer locally caches the data while the borrower is temporarily unavailable, the multiplexer is not requesting that the individual lenders cache data. Therefore, the multiplexer may not need to renegotiate pricing with the individual lenders, as the lenders are not performing any caching of data. Thus, in embodiments, the multiplexer may charge a lower amount to cache the data locally, as compared to the lenders caching the data, as this may alleviate renegotiation of pricing between each of the individual lenders and the multiplexer.

This system and method can be implemented through the use of the ad hoc network, multiplexers and state information table as set forth above. The use of the state table may be used to perform the signaling between borrower, lender and multiplexer. For example, as shown below in TABLE 5, if a borrower decides to temporarily leave the ad hoc network, the borrower may broadcast a state table with the following information:

TABLE 5

| Node Name | Node Type | Location | File Requested for Transfer | Price | Service Level Objective | Current Quality of Service |
| --- | --- | --- | --- | --- | --- | --- |
| Borrower 1 | Borrower | Wi-Fi network 'AIRPORT' IP Address: 192.168.2.3 | http://location.com/myfile | NA | NA | TEMPORARILY UNAVAILABLE |
| Lender 1 | Lender | Wi-Fi network 'AIRPORT' IP Address: 192.168.2.10 | NA | $5/MB | Can download at 1 kb/sec | NA |
| Lender 2 | Lender | Bluetooth name Pairing key: 1234 | NA | $10/MB | Can download at 2 kb/sec | NA |

Figure 10:
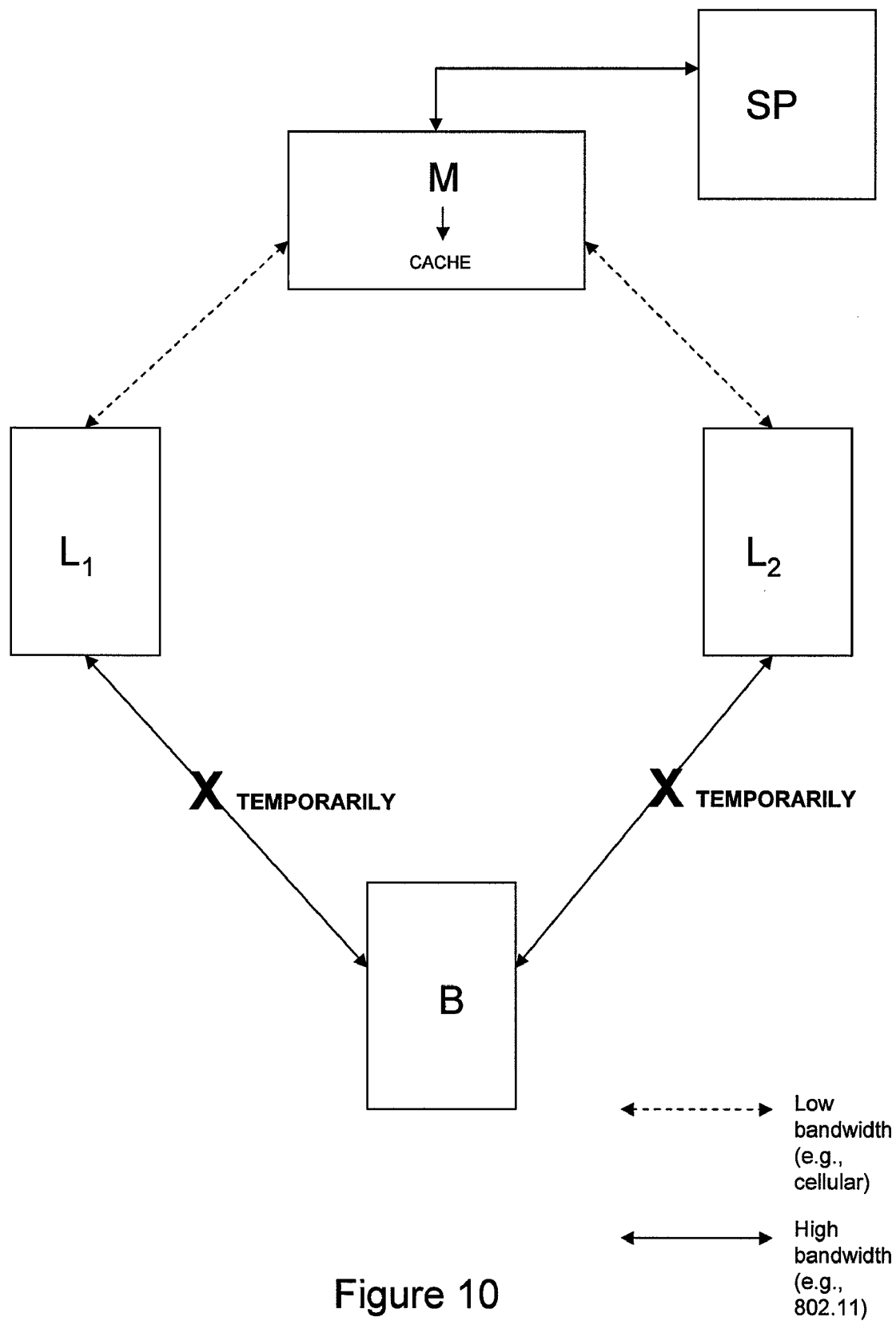
FIG. 10 is an overview of temporarily leaving an ad hoc network in a multiplexed environment, according to aspects of the invention.

FIG. 10 shows an aspect of the invention where the borrower has temporarily left the bandwidth-sharing ad hoc network established in a multiplexed environment. As is shown in FIG. 10, the high bandwidth connections between the borrower B and the lenders $L_1$ and $L_2$ have been temporarily severed. Additionally, the multiplexer remains connected via the high bandwidth connection to the data location SP, and continues to download data. Further, the lenders $L_1$ and $L_2$ remain connected via the low bandwidth connection to the multiplexer M. Additionally, as is shown in FIG. 10, the multiplexer M locally caches the data received from the data location SP. In embodiments, a multiplexer may elect to only cache for a small amount of time to save local space, in which case the multiplexer may continue downloading until the cached data reaches a certain threshold and then stop.

As shown in TABLE 5, the borrower's "Current Quality of Service" cell has been modified to "TEMPORARILY UNAVAILABLE". In a peer-to-peer environment, upon receiving this updated state table, the lenders may stop transmitting data to the borrower, continue to download data from the data source, and cache the data locally, such that when the borrower is again available, the data can be transmitted from the lenders' respective caches to the borrower.

In a multiplexed environment, in embodiments, the borrower may transmit a similar state table (with a multiplexer identified in the "Node Type" column), with a modified "Current Quality of Service" cell to request temporary caching of data. The multiplexer may receive this request and signal for the lenders to stop transmitting data to the lender, cache the data downloaded from the multiplexer locally, and to transmit the data to the borrower once the borrower is available again.

Flow Diagrams

The steps of the flow diagrams described herein may be implemented in the environment of FIG. 1 as well as using the embodiments of FIGS. 5-10 to provide formation and rearrangement instructions for leaving an ad hoc network, either permanently or temporarily. In each of the embodiments, described below, a bandwidth sharing agreement may be reached on data, quality of service (QoS) and associated costs between borrowers, lenders and/or multiplexers.

The flow diagrams may equally represent high-level block diagram of the invention. The steps of the flow diagrams may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 11:
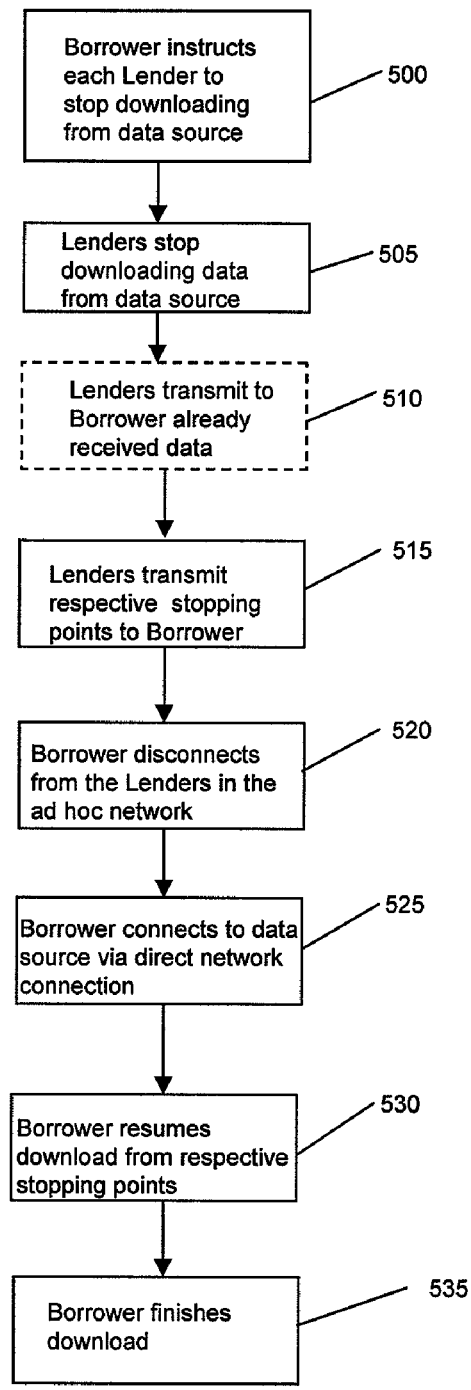
FIG. 11 is a flow chart of steps for implementing aspects of the invention.

FIG. 11 shows a flow chart for transitioning out of the ad hoc network in a peer-to-peer environment. While the flow chart of FIG. 11 shows an order of steps, it is noted that these steps may be completed in a different order. For example, the borrower may connect to the data source via the direct network connection before the borrower disconnects from the lenders in the ad hoc network.

As shown in FIG. 11, at step 500, a borrower may inform the lenders that the borrower would like to transition out of the ad hoc network and may instruct the lenders to stop downloading data from the data source. As described above, the borrower may update the state table to inform the lenders of this decision. At step 505, the lenders may stop downloading data from the data source.

At step 510, the lenders may transmit to the borrower data already received by the respective lenders. As described above and further below, step 510 may be an optional step (indicated by the dashed lines). At step 510, the borrower may receive from the lenders the data already downloaded by the lenders from the data source. However, the receipt of this data would still be via the ad hoc network, which may be at a lower bandwidth than the borrower's now available direct connection. Accordingly, the borrower may opt to download the data directly from the data source, notwithstanding the fact that the lenders already may have downloaded this data from the data source, because the borrower may now have a faster direct connection to the data source.

At step 515, the lenders may transmit to the borrower their respective stopping points of the data download. Naturally, the respective stopping points depend upon whether optional step 510 was performed.

At step 520, the borrower may disconnect from the lenders in the ad hoc network. At step 525, the borrower may connect to the data source via a direct network connection. At step 530, the borrower may resume the download of data from the data source from the respective stopping points by requesting the remaining data from the data source beginning from the respective stopping points. At step 535, the borrower may finish the download.

Figure 12:
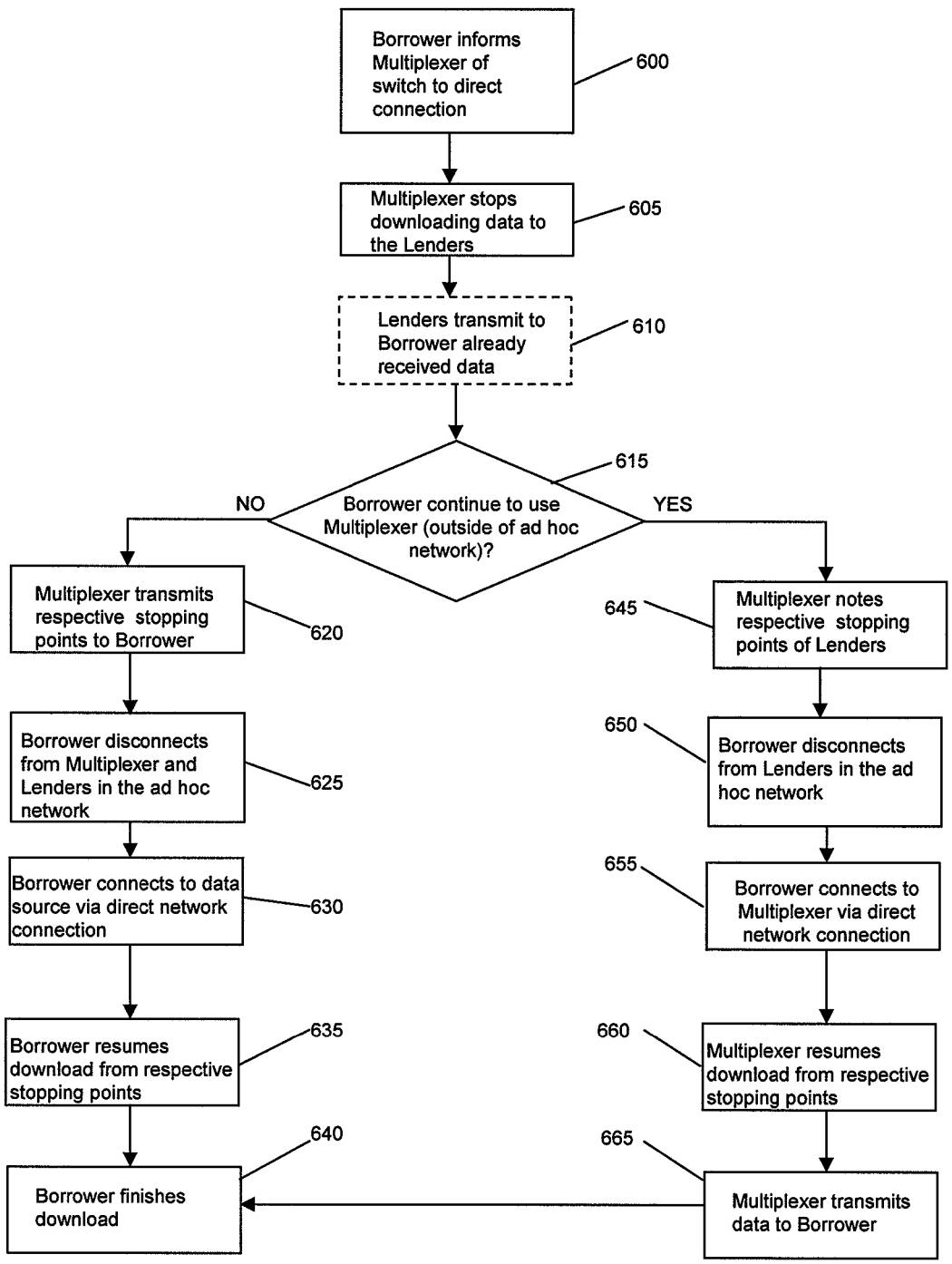
FIG. 12 is a flow chart of steps for implementing aspects of the invention.

FIG. 12 shows a flow chart for transitioning out of the ad hoc network in a multiplexed environment. While the flow chart of FIG. 12 shows an order of steps, it is noted that these steps may be completed in a different order. For example, the borrower may connect to the data source via the direct network connection before the borrower disconnects from the lenders and the multiplexer in the ad hoc network.

As shown in FIG. 12, at step 600, the borrower may inform the multiplexer of the transition out of the ad hoc network to a direct connection. As described above, the borrower may update the state table to inform the multiplexer of this decision. At step 605, the multiplexer may stop downloading data to the lenders.

At step 610, the lenders may transmit to the borrower data already received by the respective lenders from the multiplexer. As described above and further below, step 610 may be an optional step (indicated by the dashed lines). At step 610, the borrower may receive from the lenders the data already downloaded by the lenders from the data source. However, the receipt of this data would still be via the ad hoc network, which may be at a lower bandwidth than the borrower's now available direct connection. Accordingly, the borrower may opt to download the data from the data source, notwithstanding the fact that the lenders already may have downloaded this data from the multiplexer, because the borrower may now have a faster direct connection to the data source.

At step 615, a determination may be made as to whether the borrower will continue to use the multiplexer in conjunction with the direct network connection. It is noted that continuing to use the multiplexer with a direct connection may only be advantageous with multiplexers outside of the ad hoc network, e.g., a web-based service. That is, with a multiplexer within the ad hoc network, the borrower's connection to the multiplexer and/or the multiplexer's connection to the data source may be lower bandwidth connections, as compared to the borrower's now available direct network connection.

If, at step 615, a determination is made to discontinue using the multiplexer, at step 620, the multiplexer may transmit the lenders' respective stopping points to the borrower. At step 625, the borrower may disconnect from the multiplexer and the lenders in the ad hoc network. At step 630, the borrower may connect to the data source via the direct connection. At step 635, the borrower may resume the download from the respective stopping points by requesting the remaining data from the data source starting from the respective stopping points. At step 640, the borrower may complete the download.

If, at step 615, a determination was made to continue using the multiplexer in conjunction with the direct network connection, at step 645, the multiplexer may note the lenders' respective stopping points. At step 650, the borrower may disconnect from the lenders in the ad hoc network. At step 655, the borrower may connect to the multiplexer via the direct connection. At step 660, the multiplexer may resume the download from the lenders' respective stopping points by requesting the remaining data from the data source starting from the respective stopping points. At step 665, the multiplexer may transmit the data to the borrower via the high bandwidth direct network connection. At step 640, the borrower may complete the download.

Figure 13:
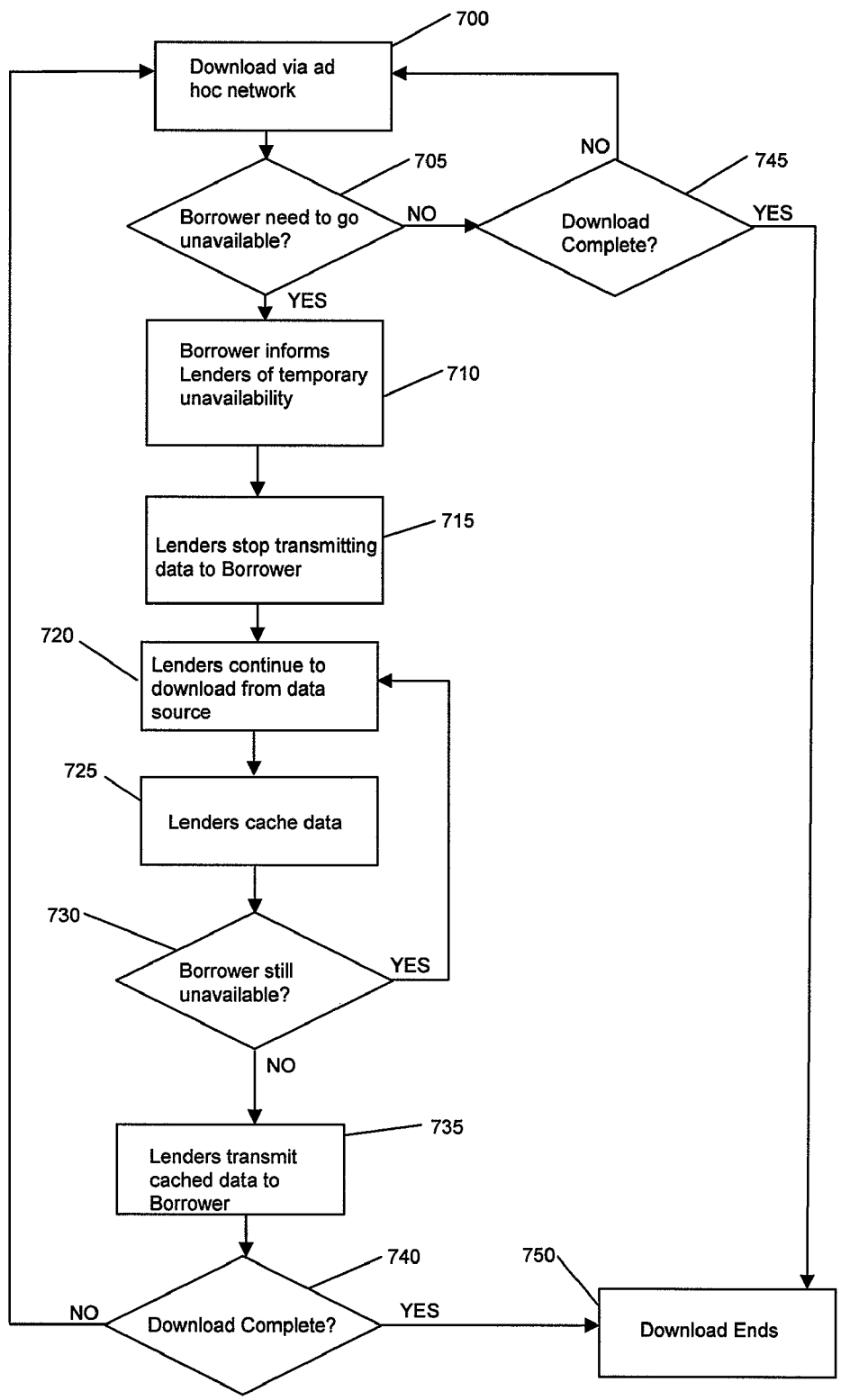
FIG. 13 is a flow chart of steps for implementing aspects of the invention.

FIG. 13 shows a flow chart for temporarily leaving the ad hoc network in a peer-to-peer environment. While the flow chart of FIG. 13 shows an order of steps, it is noted that these steps may be completed in a different order. For example, the lenders may continue to download data from the data source before the lenders stop transmitting data to the borrower.

As shown in FIG. 13, at step 700, the borrower may download data via the ad hoc network. At step 705, a determination of whether the borrower will be unavailable may be made. If, at step 705, it is determined that the borrower will be unavailable, at step 710, the borrower may inform the lenders of the temporary unavailability. As described above, in embodiments, the borrower may inform the lenders of the borrower's temporary unavailability by updating the state table.

At step 715, the lenders may stop transmitting data to the borrower via the ad hoc network. At step 720, the lenders may continue to download the data from the data source. At step 725, the lenders may locally cache the downloaded data. At step 730, a determination of whether the borrower is still unavailable may be made. If at step 730, it is determined that the borrower is still unavailable, then the process continues at step 720. If at step 730, it is determined that the borrower is no longer unavailable, at step 735, the lenders may transmit the cached data to the borrower via the rejoined bandwidth-sharing ad hoc network.

At step 740, a determination of whether the download is complete may be made. If, at step 740, it is determined that the download is not complete, then the process continues at step 700. If, at step 740, it is determined that the download is complete, at step 750, the download may end.

If, at step 705, it is determined that the borrower will not be unavailable, at step 745, a determination of whether the download is complete may be made. If, at step 745, it is determined that the download is not complete, the process continues at step 700. If, at step 745, it is determined that the download is complete, at step 750, the download may end.

Figure 14:
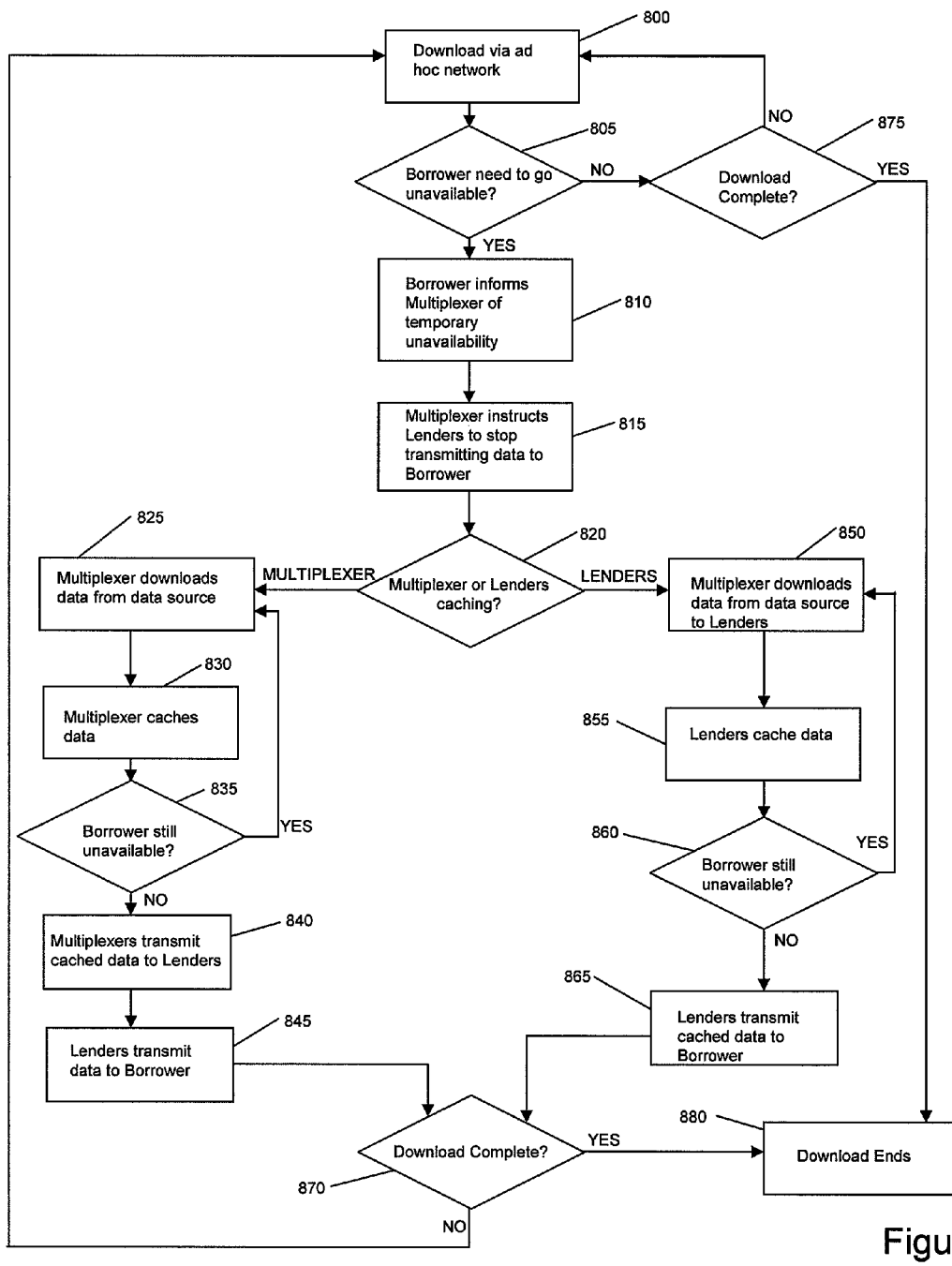
FIG. 14 is a flow chart of steps for implementing aspects of the invention.

FIG. 14 shows a flow chart for temporarily leaving the ad hoc network in a multiplexed environment. While the flow chart of FIG. 14 shows an order of steps, it is noted that these steps may be completed in a different order. For example, the lenders may continue to download data from the multiplexer before the lenders stop transmitting data to the borrower.

As shown in FIG. 14, at step 800, the borrower may download data via the bandwidth-sharing ad hoc network. At step 805, a determination of whether the borrower needs to go unavailable may be made. If, at step 805, it is determined that the borrower does need to go unavailable, at step 810, the borrower may inform the multiplexer of the temporary unavailability. As described above, in embodiments, the borrower may inform the multiplexer of the borrower's temporary unavailability by updating the state table. At step 815, the multiplexer may instruct the lenders to stop transmitting data to the borrower via the ad hoc network.

At step 820, a determination of whether the lenders or the multiplexer will cache data may be made. In embodiments, the borrower, the lenders or the multiplexer may make this determination. If, at step 820, it is determined that the multiplexer will locally cache the data, at step 825, the multiplexer may continue to download data from the data source. At step 830, the multiplexer may locally cache the data. At step 835, a determination of whether the borrower is still unavailable may be made. If, at step 835, it is determined that the borrower is still unavailable, the process continues at step 825. If, at step 835 it is determined that the borrower is no longer unavailable, at step 840, the multiplexer may transmit the cached data to the lenders. At step 845, the lenders may transmit the data to the borrower via the ad hoc network. At step 870, a determination of whether the download is complete may be made. If, at step 870, it is determined that the download is not complete, the process continues at step 800. If, at step 870, it is determined that the download is complete, at step 880, the download over the ad hoc network ends.

If, at step 820, it is determined that the lenders will locally cache the data received from the multiplexer, at step 850, the multiplexer may continue to download data from the data source to the lenders. At step 855, the lenders may locally cache the downloaded data. At step 860, a determination of whether the borrower is still unavailable may be made. If, at step 860, it is determined that the borrower is still unavailable, the process continues at step 850. If, at step 860, it is determined that the borrower is no longer unavailable, at step 865, the lenders may transmit the cached data to the borrower. At step 870, a determination of whether the download is complete may be made. If, at step 870, it is determined that the download is not complete, the process continues at step 800. If, at step 870, it is determined that the download is complete, at step 880, the download over the ad hoc network may end.

If, at step 805, it is determined that the borrower does not need to go unavailable, at step 875 a determination of whether the download is complete may be made. If, at step 875, it is determined that the download is not complete, the process continues at step 800. If, at step 875, it is determined that the download is complete, at step 880, the download may end.

While the invention has been described in terms of embodiments, those skilled in the art will recognize that the invention can be practiced with modifications and in the spirit and scope of the appended claims.

What is claimed is:

1. A method, comprising:
    establishing an ad hoc network between at least a borrower and at least one lender of bandwidth;
    downloading requested data from a data source via the ad hoc network;
    leaving the ad hoc network while maintaining some of the downloaded requested data;
    transmitting an instruction to stop downloading the requested data based on the borrower leaving the ad hoc network; and
    reestablishing a connection to the data source for completing the downloading of the requested data.

2. The method of claim 1, further comprising:
    leaving the ad hoc network permanently;
    establishing a direct connection to the data source; and
    completing the download via the direct connection.

3. The method of claim 2, wherein the transmitting the instruction to stop downloading the requested data comprises the borrower directly instructing the at least one lender to stop downloading the requested data from the data source, and further comprising directing the at least one lender to perform one of: (i) transfer to the borrower any of the requested data that was downloaded prior to the instruction to stop, or (ii) do not transfer to the borrower any of the requested data that was downloaded prior to the instruction to stop.

4. The method of claim 3, further comprising:
    receiving data already downloaded from the data source to the at least one lender.

5. The method of claim 3, further comprising:
transmitting a respective download stopping point to the borrower; and
resuming the download via the direct connection to the data source from the respective download stopping point.

6. The method of claim 1, wherein the ad hoc network is established in a peer-to-peer environment.

7. The method of claim 1, wherein:
the ad hoc network is established in a multiplexed environment in which a multiplexer downloads the requested data from the data source to the at least one lender; and
the transmitting the instruction to stop downloading the requested data comprises instructing the multiplexer to not download any more of the requested data from the data source to the at least one lender.

8. The method of claim 7, further comprising:
informing the multiplexer of a switch from the ad hoc network to a direct connection; and
stopping downloading the requested data from the data source to the at least one lender.

9. The method of claim 8, further comprising:
receiving data already downloaded from the multiplexer to the at least one lender.

10. The method of claim 8, further comprising:
continuing to use the multiplexer to complete the download of the requested data.

11. The method of claim 10, further comprising:
the multiplexer noting the at least one lender's respective download stopping point;
disconnecting from the at least one lender;
connecting to the multiplexer via the direct connection; and
resuming the downloading of the requested data from the respective download stopping point via the multiplexer.

12. The method of claim 8, further comprising discontinuing to use the multiplexer to complete the download of the requested data.

13. The method of claim 12, further comprising:
receiving the at least one lender's respective download stopping point;
disconnecting from the multiplexer and the at least one lender in the ad hoc network;
connecting to the data source via the direct connection; and
resuming the download of the requested data from the respective download stopping point.

14. The method of claim 1, wherein steps of claim 1 are provided by a service provider.

15. The method of claim 1, wherein a service provider at least one of creates, maintains, deploys, and supports a computer infrastructure that performs steps of claim 1.

16. The method of claim 1, wherein steps of claim 1 are provided on a subscription, advertising, and/or fee basis.

17. A method for deploying an application in a computing environment, comprising:
providing a computer infrastructure being operable to:
establish an ad hoc network between at least a borrower and at least one lender of bandwidth;
maintain data which is already downloaded after the borrower in the ad hoc network leaves the ad hoc network;
transmit an instruction to stop downloading requested data based on the borrower leaving the ad hoc network;
direct the at least one lender to perform one of: (i) transfer to the borrower any of the requested data that was downloaded prior to the instruction to stop, or (ii) do not transfer to the borrower any of the requested data that was downloaded prior to the instruction to stop; and
permit reestablishment of a connection to a data source for completing the downloading of the requested data.

18. The method of claim 17, wherein a borrower downloads information from the computer infrastructure.

19. The method of claim 17, further comprising establishing a direct connection to the data source to complete the download.

20. The method of claim 17, wherein the transmitting the instruction to stop downloading the requested data comprises the borrower directly instructing the at least one lender to stop downloading the requested data from the data source.

21. The method of claim 17, further comprising transmitting a respective download stopping point to the borrower such that a resumption of the downloading will commence at the respective download stopping point.

22. The method of claim 17, wherein the ad hoc network is established in at least one of a peer-to-peer environment and a multiplexed environment.

23. The method of claim 17, further comprising informing a multiplexer of a switch from the ad hoc network to direct connection and stopping downloading the requested data from the data source to the at least one lender, multiplexer is configured to download the requested data from the data source to the at least one lender.

24. The method of claim 17, wherein the computer infrastructure is at least one of created, maintained, deployed, and supported by a service provider.

25. A system comprising a server having a database containing data associated with at least one lender and a borrower in an ad hoc network, and at least one of a hardware and software component for establishing an ad hoc network between at least the borrower and the at least one lender of bandwidth, the at least one of a hardware and software component downloading requested data from a data source to the borrower via the ad hoc network and maintaining the downloaded data when the borrower permanently or temporarily leaves the ad hoc network, and, subsequently, downloading a remaining portion of the requested data via a same type or different type connection, wherein the at least one of a hardware and software component is further configured to:
transmit an instruction to stop downloading requested data based on the borrower leaving the ad hoc network; and
direct the at least one lender to perform one of: (i) transfer to the borrower any of the requested data that was downloaded prior to the instruction to stop, or (ii) do not transfer to the borrower any of the requested data that was downloaded prior to the instruction to stop.

26. The system of claim 25, wherein, when the borrower leaves the ad hoc network permanently, at least one of a hardware and software component is configured to:
establish a direct connection between the borrower and one of a data source and a multiplexer connected to the data source; and
complete the download via the direct connection.

27. The system of claim 25, wherein a service provider at least one of creates, maintains, deploys and supports the at least one of a hardware and software component.

28. The system of claim 25, wherein the at least one of a hardware and software component resides on a server provided by a service provider.

29. A computer program product comprising a computer useable medium having readable program code embodied in the medium, the computer program product includes at least one component to:

establish an ad hoc network between at least a borrower and at least one lender of bandwidth;
download requested data from a data source to the borrower via the ad hoc network;
transmit an instruction to stop downloading requested data based on the borrower leaving the ad hoc network;
direct the at least one lender to perform one of: (i) transfer to the borrower any of the requested data that was downloaded prior to the instruction to stop, or (ii) do not transfer to the borrower any of the requested data that was downloaded prior to the instruction to stop;
maintain at least a portion of requested data already downloaded; and
complete the download of requested data to the borrower without re-downloading the requested data already downloaded.

30. The method of claim 1, further comprising the borrower temporarily leaving the ad hoc network.

31. The method of claim 30, further comprising:
informing the at least one lender of a temporary unavailability;
stopping receiving of requested data; and
locally caching downloaded requested data from the data source.

32. The method of claim 31, further comprising:
rejoining the ad hoc network;
receiving locally cached requested data; and
completing the download of the requested data via the ad hoc network.

33. The method of claim 1, further comprising:
informing a multiplexer of a temporary unavailability;
instructing the at least one lender to stop transmitting requested data to the borrower; and
locally caching downloaded requested data from the data source.

34. The method of claim 33, wherein the multiplexer locally caches the downloaded requested data from the data source, while continuing to download the requested data from the data source.

35. The method of claim 34, further comprising:
rejoining the ad hoc network;
receiving the locally cached requested data via the at least one lender.

36. The method of claim 33, wherein the at least one lender locally caches the downloaded requested data from the data source, while the multiplexer continues to download the requested data from the data source to the at least one lender.

37. The method of claim 36, further comprising:
rejoining the ad hoc network; and
receiving the locally cached requested data from the at least one lender.

38. The method of claim 33, further comprising: renegotiating costs for locally caching requested data by one of the multiplexer and the at least one lender.

39. The system of claim 25, wherein, when the borrower leaves the ad hoc network temporarily, at least one of a hardware and software component is configured to:
inform one of the at least one lender and a multiplexer of the borrower's temporary unavailability;
stop the transmission of the requested data to the borrower;
continue the downloading of the requested data from the data source to at least one of the at least one lender and the multiplexer;
locally cache downloaded requested data by one of the at least one lender and the multiplexer; and
transmit cached downloaded requested data to the borrower when the borrower rejoins the ad hoc network.

* * * * *